United States Patent [19]
DeHart et al.

[11] Patent Number: 5,517,636
[45] Date of Patent: May 14, 1996

[54] PLATFORM INDEPENDENT DATA COMMUNICATION SYSTEM AND METHOD

[75] Inventors: Ralph DeHart, Willow Grove; Ian Farbrother, West Chester; John A. Landis, Sellersville, all of Pa.; Theresa J. Mundt, Trenton, N.J.; Steven Koss, Downingtown, Pa.

[73] Assignee: Unisys Corporation, Blue Bell, Pa.

[21] Appl. No.: 323,416

[22] Filed: Oct. 13, 1994

Related U.S. Application Data

[63] Continuation of Ser. No. 818,650, Jan. 7, 1992, abandoned.

[51] Int. Cl.$^6$ .................................................. G06F 3/00
[52] U.S. Cl. ........................... 395/500; 395/650; 395/284; 395/72.7
[58] Field of Search .................................. 395/47.5, 700, 395/575, 200, 800, 275; 364/146; 370/94.1

[56] References Cited

U.S. PATENT DOCUMENTS

| | | | |
|---|---|---|---|
| 4,533,997 | 8/1985 | Furgerson | 395/425 |
| 4,649,479 | 3/1987 | Advani et al. | 395/700 |
| 4,914,619 | 4/1990 | Harris et al. | |
| 4,974,151 | 11/1990 | Advani et al. | 395/700 |
| 4,975,829 | 12/1990 | Clarey et al. | 395/275 |
| 4,979,107 | 12/1990 | Advani et al. | 395/575 |
| 5,063,500 | 11/1991 | Shorter | 395/200 |
| 5,142,469 | 8/1992 | Weisenborn | 364/146 |
| 5,237,387 | 10/1993 | Richek et al. | 395/800 |
| 5,265,252 | 11/1993 | Rawson, III et al. | 395/700 |
| 5,377,191 | 12/1994 | Farrell | 370/94.1 |

OTHER PUBLICATIONS

*Program–to Program Communications in Systems Application Architecture (SAA) Environments*, Second Edition, International Business Machines, May 1990, Document #GG24–3482–1, pp. 1–43, 103–127.
*System V Interface Definition*, Third Edition, vol. III published by AT&T (1989), pp. 8–24 through 8–37.

*Primary Examiner*—Alyssa H. Bowler
*Assistant Examiner*—Dan Fiul
*Attorney, Agent, or Firm*—Robert R. Axenfeld; Mark T. Starr

[57] ABSTRACT

This invention teaches a method and system for a computer program to accomplish communication in a computer environment which is independent of the system upon which the program is executing. This computer environment constitutes both the machine on which the program is running and other machines with which there exists a communication path. A method by which a program can be written to achieve such communication without knowledge as to what machine will be on the receiving end of the communication is provided. Knowledge as to what low-level protocol will be used to connect separate machines is not required at the time the application is written.

2 Claims, 13 Drawing Sheets

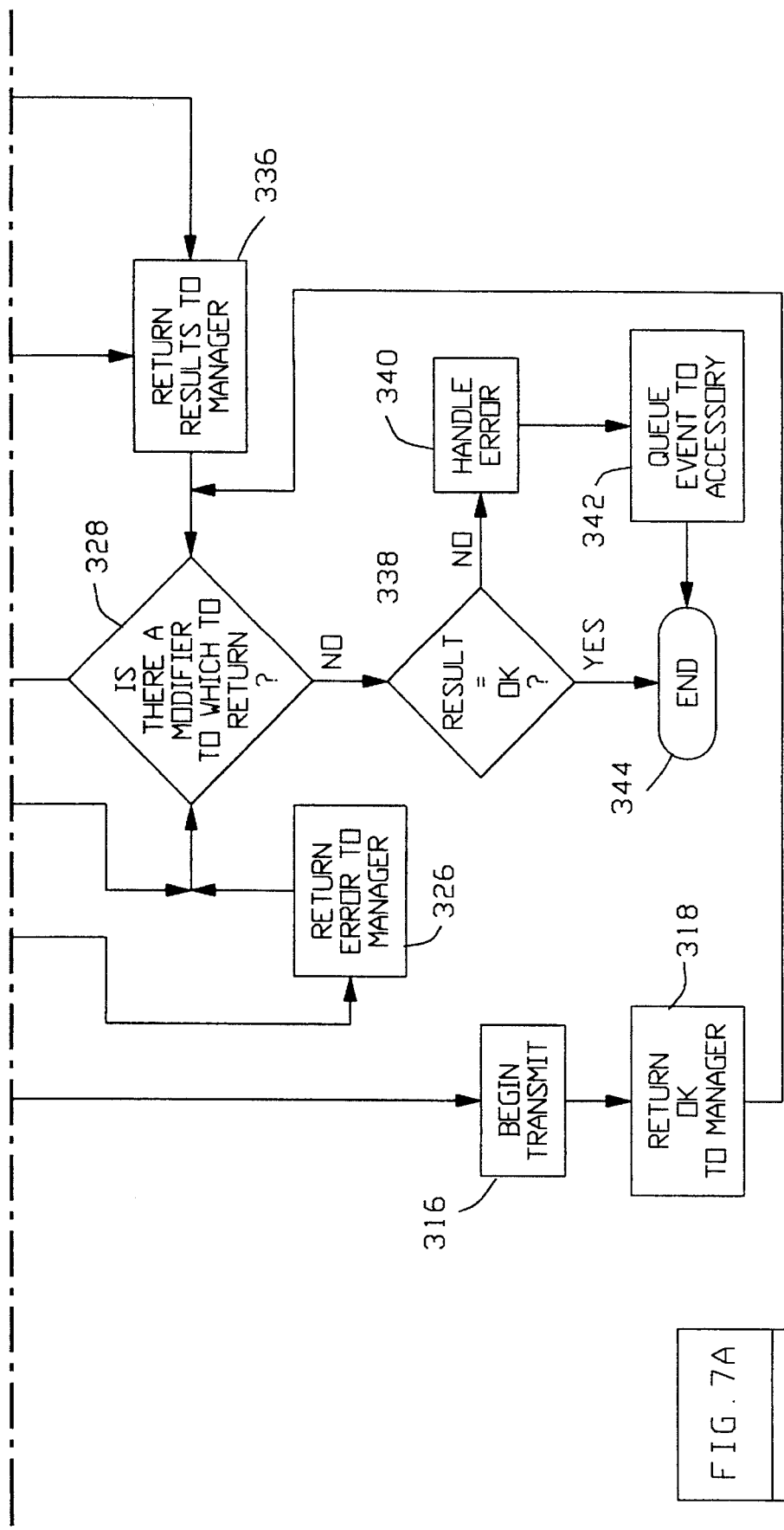

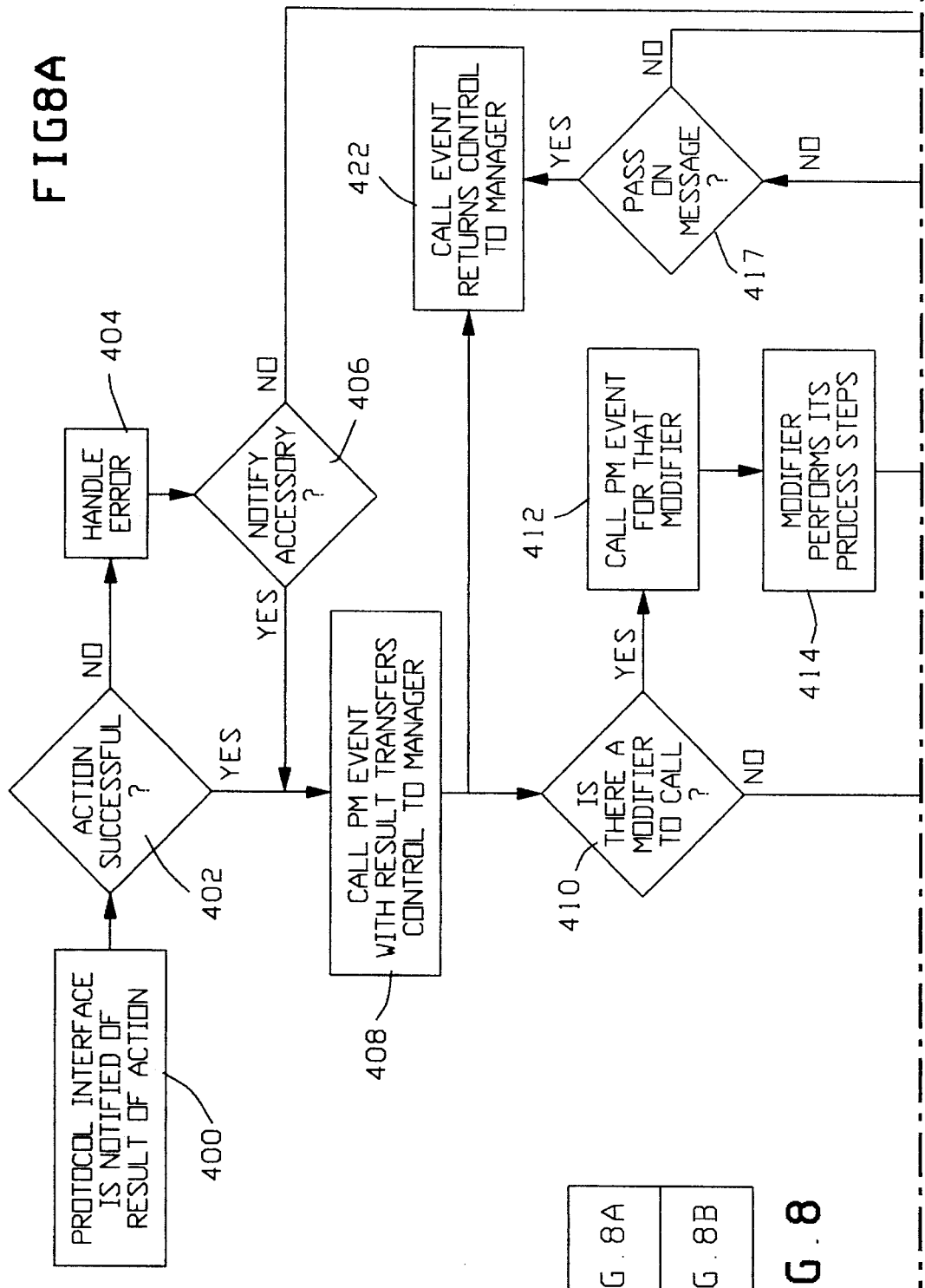

PLATFORM INDEPENDENT DATA COMMUNICATION SYSTEM AND METHOD

This application is a continuation of application Ser. No. 07/818,650, filed Jan. 7, 1992 now abandoned.

TECHNICAL FIELD

This invention relates generally to computer systems, and more particularly to the field of data communications in a computer environment.

BACKGROUND OF THE INVENTION

In the past, communication between computer processes took one of two general forms. Programs running on different machines would communicate by using a data communication, or datacomm, method. Programs running on the same machine would employ an inter-process communication method. Both methods could be implemented in a variety of ways requiring programmers to implement a multiplicity of communication protocols to permit a program to communicate within a platform and across platforms.

The datacomm method required writing a program to conform to a specified data communications protocol and required the program to interact with a low-level datacomm driver program which managed the hardware to perform such communications. This method limited programs running on a given platform to communicating only with programs on other hardware platforms on which a compatible driver was implemented. In addition, the programs which are to communicate must utilize the correct protocol and driver. This can severely limit the number of programs and classes of machines with which a program can communicate.

The datacomm protocol and the associated drivers were not suitable for communication by processes executing on the same machine. That is the driver could not handle communication between processes on the same machine. The mechanism used to accomplish such communication was usually to define and use an inter-process communication protocol. Such a mechanism requires programs that wish to communicate to cooperate. That is, there is a requirement that the programs adhere to the specific protocol and use a pre-defined path of communication. Once written and compiled, changes may be made to the communication path and protocol only by re-coding and recompiling the program involved. Note also that both the sending and receiving program must adhere to this same protocol.

Generally, once the program is written for a specified path using a specified protocol, the program must be rewritten and re-compiled if any changes to this path are necessary. One of the better methods known to change a path is found in the UNIX operating environment which provides the concept of "streams". A stream permits the path to be altered by interposing a series of modules between the program and the end of the stream. However, these modules may still only be interposed programmatically in that the program must call the ioctl() routine to add a module to the stream. In this sense, the program must still be tailored to the specific path stream. To change the path, the program must be changed, re-compiled and relinked. Note also that the use of streams is limited to machines which support the UNIX operating system. Another limitation is that the receiving program must adhere to the UNIX protocol for the use of streams.

SUMMARY AND OBJECTS OF THE INVENTION

This invention teaches a method and system for a computer program to accomplish communication in a computer environment which is independent of the system upon which the program is executing. This computer environment constitutes both the machine on which the program is running and other machines with which there exists a communication path. It divulges a method and provides a means by which a program can be written to achieve such communication without knowledge as to what machine will be on the receiving end of the communication. Nor is knowledge required as to what low-level protocol will be used to connect separate machines.

Specifically, what is taught is a method of accomplishing data communications in a system which is portable to a plurality of computer operating environments. The system includes a manager for controlling the passage of a message within the system and a plurality of programs to perform a variety of message processing steps. In the subject invention these message processing programs are of two kinds; modifier interface programs or protocol interface programs.

The method includes a means of configuring a communication path for the passage of messages wherein said path comprises a specification of at least one of said plurality of programs which are to process messages over the path. In the preferred embodiment, this configuration occurs dynamically. This means the user can define the path any time before executing the application program which is to use the path without needing to re-compile or relink the application.

By use of this method and system, a program can be written once and ported to several machines. Such a program may utilize numerous data communication protocols without altering the source code of the program. As such protocols or machines evolve, these programs can continue to function without requiring any alteration, re-compilation, or re-linking. The behavior of an existing program can altered and extended through the development of appropriate modifier/protocol interface modules.

Adhering to the recommended development method will yield the greatest degree of portability for an application. However, the invention also permits the application to take advantage of platform specific capabilities by permitting deviations from the recommended design. Applications may be written to utilize specific operating system or hardware platform features while still employing this invention. Doing so, however, may forego a degree of portability.

Another object of the present invention is to permit the communication path in use by the program to be defined both at the programmatic level and at the user level. The program can be written to use a specific communication path or the user can define the path the program is to use after the program has been written and compiled. The ability of the user to define the path without recompilation includes the ability to specify the protocol to use. Again, this is possible since the present invention permits a program to be written without being limited to a specific low-level datacomm protocol.

A further object of invention is to provide a means for inter-process communication between programs on the same machine using the same interface as that used for inter-process communication between programs on different machines. Such capability frees the application writer from concern as to where the receiving process will be executing and increases the program's portability. It also permits the user to reconfigure the path in use by the program to communicate with a process on the same machine or with a process on a different machine without re-coding or recompiling the application.

A significant object of this invention is to provide a method and apparatus to configure a series of modifiers as part of the path the message takes before being sent by the underlying low-level protocol. A modifier alters or reformats the message data or its associated protocol before the message reaches the final low-level driver. In this way the "generic" message may be tailored to utilize a specific protocol. The set of modifiers which will act upon a message is determined by the path which has been defined for the application.

Another object of this invention is to provide a means for applications to share datacomm resources for a computer system, such as COM ports, in a coherent manner. The invention even permits the multiplexing of modifiers to allow channels to be shared. A channel is used by the low-level protocol interface to identify the communication connection in use with a program outside the subject invention's environment. The modifier multiplexing provides multiple, simultaneous sessions across a single channel. In other words, the identical path may be in use by multiple active sessions.

While the subject invention is characterized by the definition of a high level protocol which programs may use to accomplish data communications, the invention is more than just a protocol since it provides a manager to enforce the protocol, accomplish dynamic configuration of the communication path, and manage the handling of a message as it passes through the modifier and protocol interface levels of the path.

Although the invention requires that a program be implemented using the invention's high level protocol, the invention frees the application from the constraints normally associated with a protocol. Normally, once a program is written to a specific protocol, it may only communicate with programs that use this same protocol. However, by using the present invention a program may communicate with another program which does not use the invention's high level protocol. In fact, the identical program can communicate with programs using completely different protocols by utilizing the present invention. An object of the present invention is to permit non-conforming applications to communicate even though these applications adhere to completely different datacomm protocols. Properly configured, the low-level drivers for such non-conforming applications direct their messages to the protocol interface level of the subject invention. The message may be modified by the modifier or accessory levels of this invention and passed down a second path to be sent, using a different protocol, to a second non-conforming application. Such a communication can be accomplished without the non-conforming programs at either end of the path having been explicitly written to communicate with the other.

Other objects and advantages of the present invention will become apparent upon reading the following detailed description and upon reference to the drawings.

BRIEF DESCRIPTION OF THE DRAWINGS

FIGS. 7, 7A and 7B are logic diagrams showing the steps taken at the manager, modifier, and protocol interface levels in initiating a transmit operation.

FIGS. 8, 8A and 8B are logic diagrams which depict the steps taken by the various levels of the presently disclosed method to handle the result of a communication action.

DESCRIPTION OF THE PREFERRED EMBODIMENTS

Figure 1:
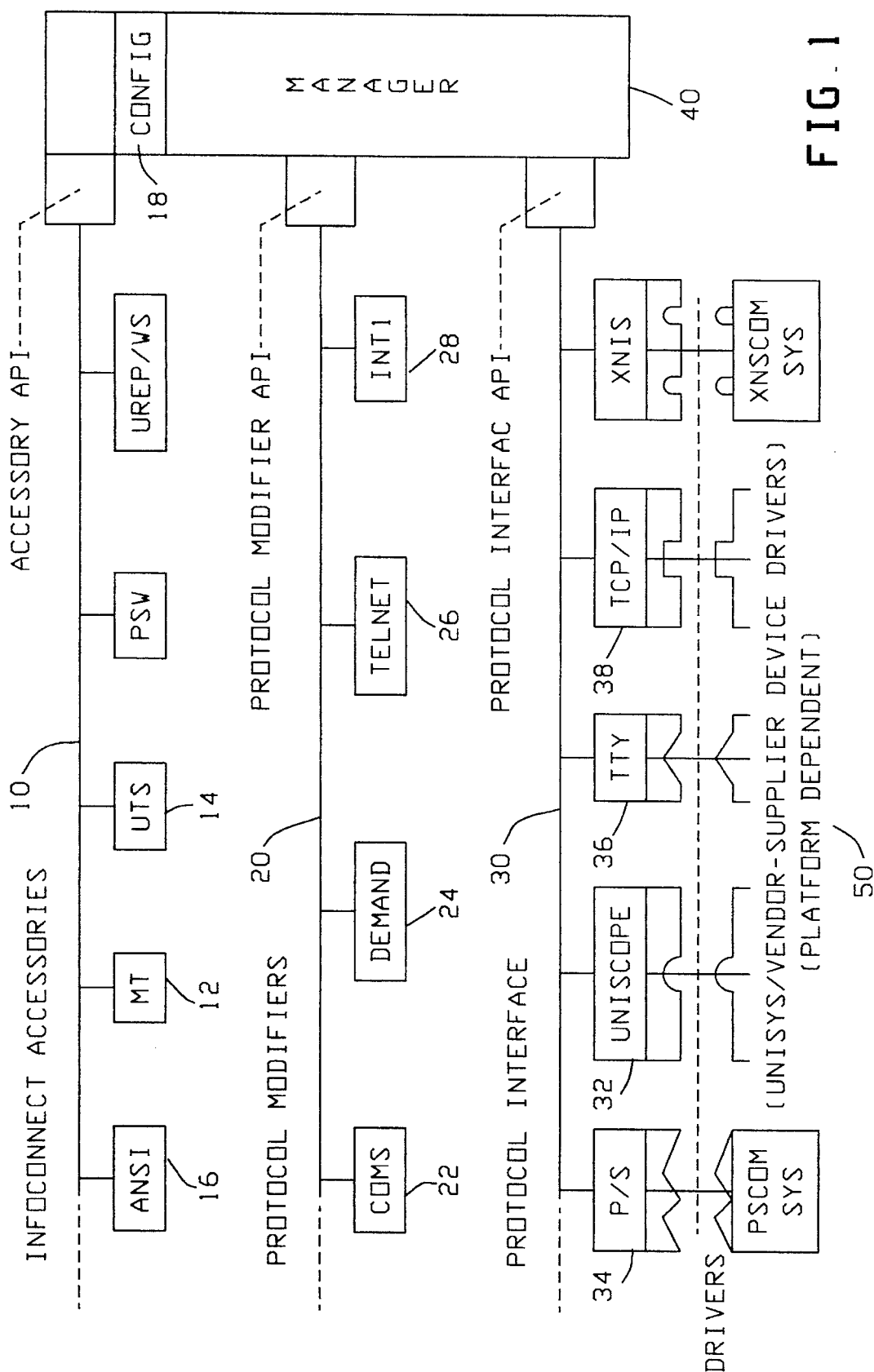
FIG. 1 is an illustration depicting the basic structure of the multi-level architecture of the present invention.

The architecture of the disclosed invention is divided into three logical levels as illustrated in FIG. 1. The topmost level 10 is referred to as the accessory or application level. The programs that run at this level are the programs which either directly interact with the user or assist other applications in interacting with the user. In the latter case, the programs inter-operate such that developers may build new accessories by using existing accessories. Examples of accessories are an MT emulator 12, a UTS emulator 14, and an ANSI terminal program 16.

The middle level is the modifier level 20. A number of modifiers may be included between the accessory level 10 and the protocol interface level 30 as part of the definition of the path. When they are included in a path definition, modifiers act as filters on all data and status information travelling the path between the accessory and the protocol interface program. In diagram 1 the modifiers are labelled 22, 24, 26, and 28.

The bottom level 30 is the protocol interface level, or worker level. At this level, the original generic communication request is translated to conform to the specifications of the connection protocol defined for the path. The protocol interface level program also performs the mapping between the generic communication path handles and the transport specific IDs. The protocol-interface level programs are written with knowledge of the specific operating system and hardware platform on which they are to run. With this information, they are able to perform the appropriate protocol transformations and handle the specific responses for the environment. Examples at this level are a poll/select (P/S) program 34 and a TCP/IP program 38.

Below the bottom level of the invention there may be provided low-level device drivers 50 which provide access over the physical connection. These drivers which may be provided are designed for a specific interface running on a specific hardware and software platform. They are accessed at the protocol interface level 30. These are not required if the protocol interface program is designed to handle the communication over the physical connection itself.

The three levels of the architecture are all connected by the manager 40. The manager 40 maintains a database of all the paths defined for the given instance. The manager 40 also provides a means for the user to add, delete, or modify these paths. At session establishment, the manager 40 loads the set of programs at the modifier interface level 20 and protocol interface level 30. All messages travelling over a path do so under the control of the manager 40. When a path is no longer needed, the manager 40 is able to deallocate the resources associated with the path.

The present system does not require an accessory level 10 program to define a specific path at the time it is written, although it is possible to do so. The system permits the path to be defined dynamically by the user, potentially long after the program has been written, compiled, and linked. Again, this is accomplished by means of the connectivity manager 40 which controls the path definition and routing of messages.

Using the programs mentioned in FIG. 1 for an example, a user might defines a path for an MT emulator 12 that consists of the COMS modifier 22, the TELNET modifier 26 and a TCP/IP protocol interface program 38. Another possible path is to use the same MT emulator 12 but have no modifier installed and use a P/S protocol interface 34. A third would be for the UTS emulator 14 to have the Demand 24 modifier installed for the path with the Uniscope 32 protocol interface. Note that the same accessory, the MT emulator 12, may be employed for use in three diverse datacomm environments without any re-coding.

Figure 11:
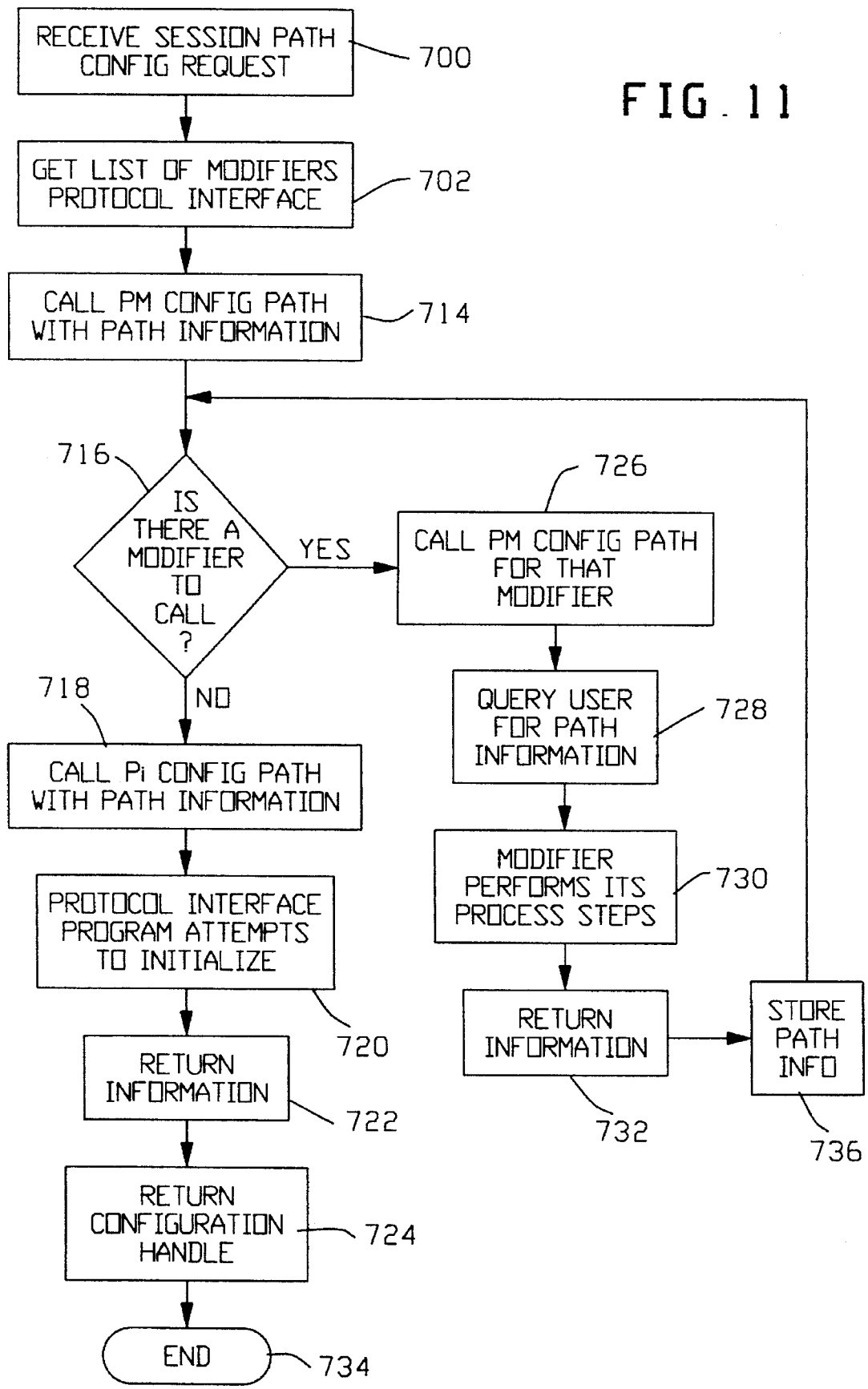
FIG. 11 is a logic diagram illustrating the steps employed by the various levels of the presently disclosed method to configure a path.

The use of the first path mentioned in the above paragraph will now be examined as an example. The user dynamically defines a path for the accessory MT emulator 12 using the configurator program (Config) 18. Config 18 is a program that permits the user to interactively define a communication path by specifying the list of programs that will comprise the path. In the presently disclosed invention Config 18 is packaged as part of the manager 40. The process of performing a configuration is further disclosed in FIG. 11 and in the accompanying text.

In this example the newly defined path for the MT 12 consists of the COMS modifier 22, the TELNET modifier 26 and the TCP/IP protocol interface 38. Like all paths for the system, the new path is identified by a "key". The accessory 12 passes the key to the connectivity manager 40 with each message action the accessory initiates.

Using the key, the manager 40 identifies the modifiers 22,26 and worker 38 that make up the path. The manager 40 passes the message to the modifiers 22,26 in the specified order, each of which acts upon the message and passes it back to the manager 40 to continue down the path. Eventually the message reaches the TCP/IP 38 protocol interface. This is where the given specific protocol is used to complete the connection with the receiving process.

The possible connections achieved by the protocol interface program are many. The program may be a standard low-level driver to complete a connection with a process on another machine. It may be a module which achieves communication with a process on the same machine using a defined inter-process communication protocol. It may be a module which routes the message to another protocol module within the invention to communicate with another process using the invention. This would cause the message to return to the control of the connectivity manager 40 and be routed back up a second defined path, perhaps through a series of modifiers, to the application level 10.

In this way the application which uses this invention may communicate with other applications which may use a variety of communication means and protocols.

Figure 2:
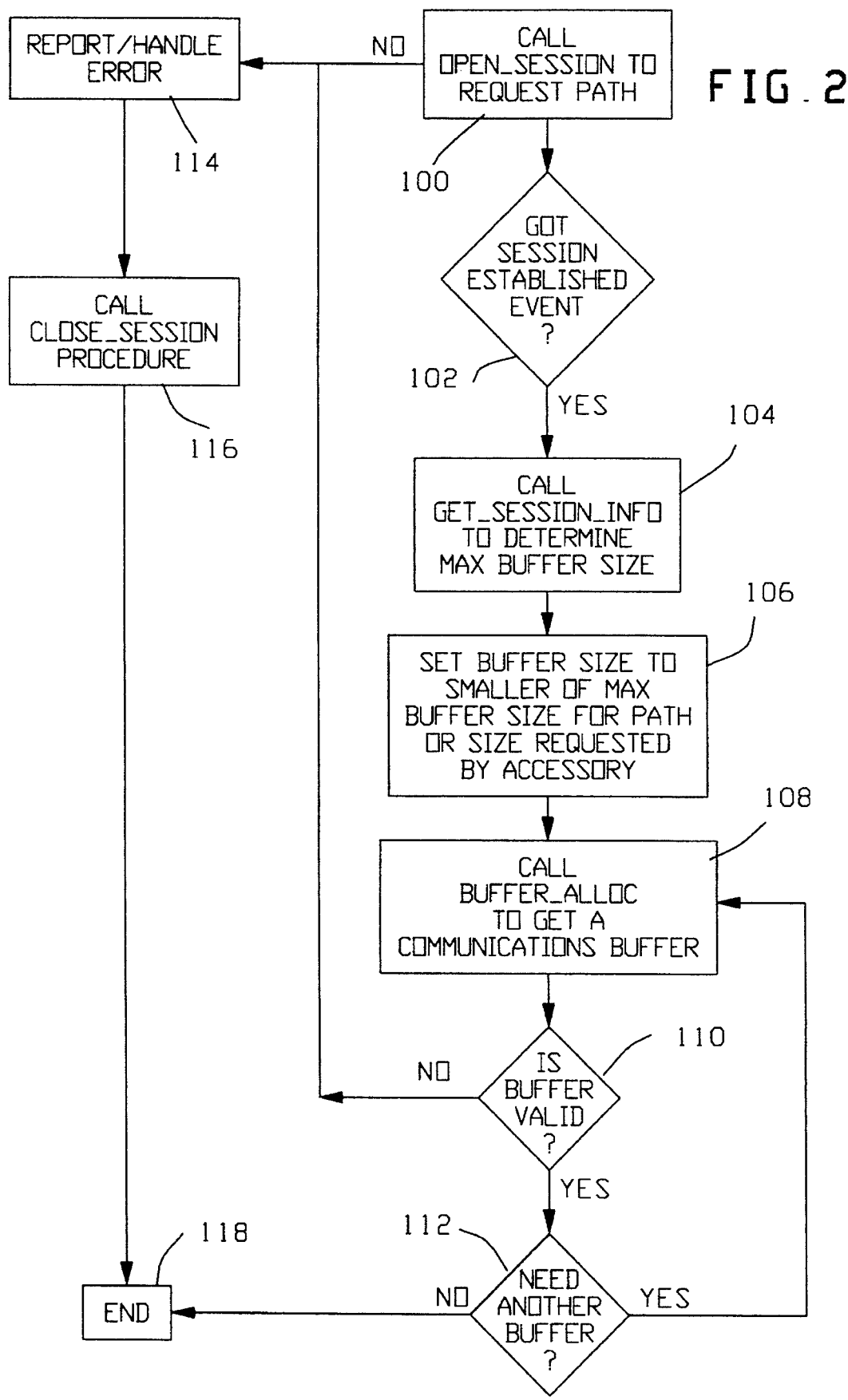
FIG. 2 is a logic diagram depicting the steps an accessory performs to open a path.

Refer now to FIG. 2 which is the logic diagram which shows the series of steps an accessory must take within the given implementation of this invention in order to open a session path. This begins with a call to the OPEN_SESSION procedure 100 to request a path. The result of this call is checked 102 to see if the path is established. If the answer is no, the application handles the error 114, perhaps including the use of a default error procedure. At this point the accessory may also check for possible causes of the error and, if appropriate, inform the user of the error. Next, a call to CLOSE_SESSION is performed 116 to clean up any resources that were allocated for the session and the process ends 118.

If result of the OPEN_SESSION call indicates success 102, the process calls GET_SESSION_INFO 104 to determine the buffer size associated with the path. Next, the accessory sets the size of any buffers required to the smaller of the maximum permitted by the path and the maximum needed or requested by the application 106. Proceeding, the accessory calls BufferAlloc 108 to get a communications buffer of the size determined in the previous step. The accessory then checks the result of the previous call 110 to see if a valid buffer was received. If a valid buffer was not received the accessory performs error handling 114 as previously described.

If a valid buffer is received, the application determines if another buffer is necessary 112. If so, the process continues to cycle through steps 108, 110, and 112 until no further buffers are needed. When all the buffers have been acquired, the process of opening a session path is complete 118.

Figure 3:
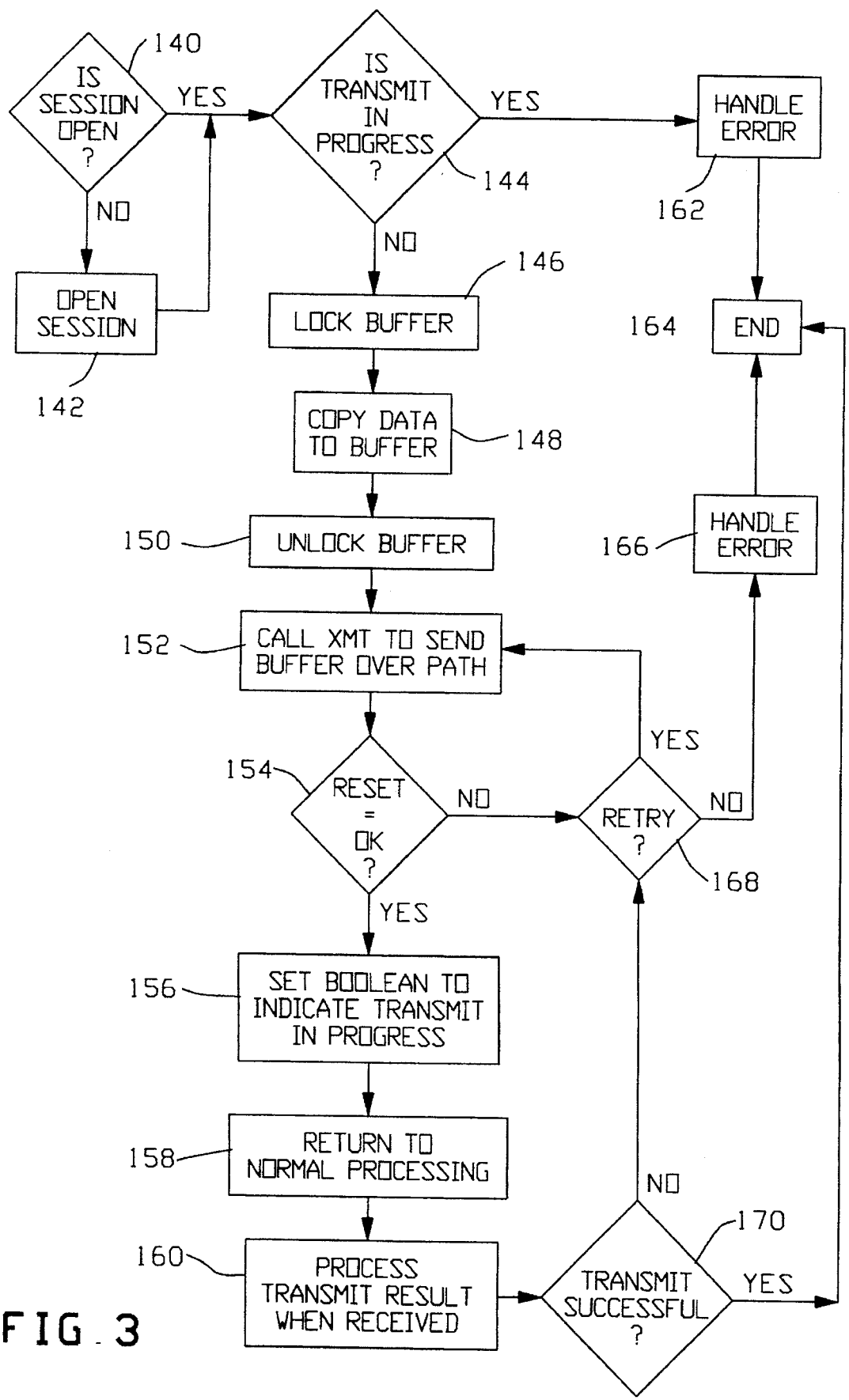
FIGS. 3, 4, and 5 are logic diagrams showing the steps an accessory employs to initiate a transmit, a receive, and a cancel respectively.

FIG. 3 shows the method used by an accessory to transmit data when the presently disclosed invention is employed. The process begins at step 140 by determining if the session is open. If the answer is no, the accessory opens a session 142 as shown in FIG. 2. When a session is open, the process checks if a transmit is already in progress 144. If so, the accessory handles the error 162 and then ends 164. Another possible approach is to wait until the previous transmit has completed without returning.

If no transmit is outstanding for the accessory, the accessory locks the buffer for the transmit 146, copies the data to be transmitted to the buffer 148, and unlocks the buffer 150. A call is then made to XMT 152 to send the buffer over the specified path. On return, the accessory checks the results of the previous procedure call 154. If it was not successful, the accessory determines if the transmit should be attempted again 168. If so, steps 152 and 154 are repeated. If not, error processing proceeds 166 and the process ends 164. If the initiation of the transmit was successful 154, then a boolean is set to indicate that a transmit is outstanding 156.

At this point the initiation of the transmit is complete and the accessory returns to normal processing 158. As part of this normal processing the accessory performs event handling as is known in the art. Eventually the accesory receives an event that indicates the result of the transmit which it processes 160. This event is checked 170 to determine if the transmit completed successfully. If not, the process determines if the transmit should be retried 168. If the transmit was successful, the process ends 164.

Figure 4:
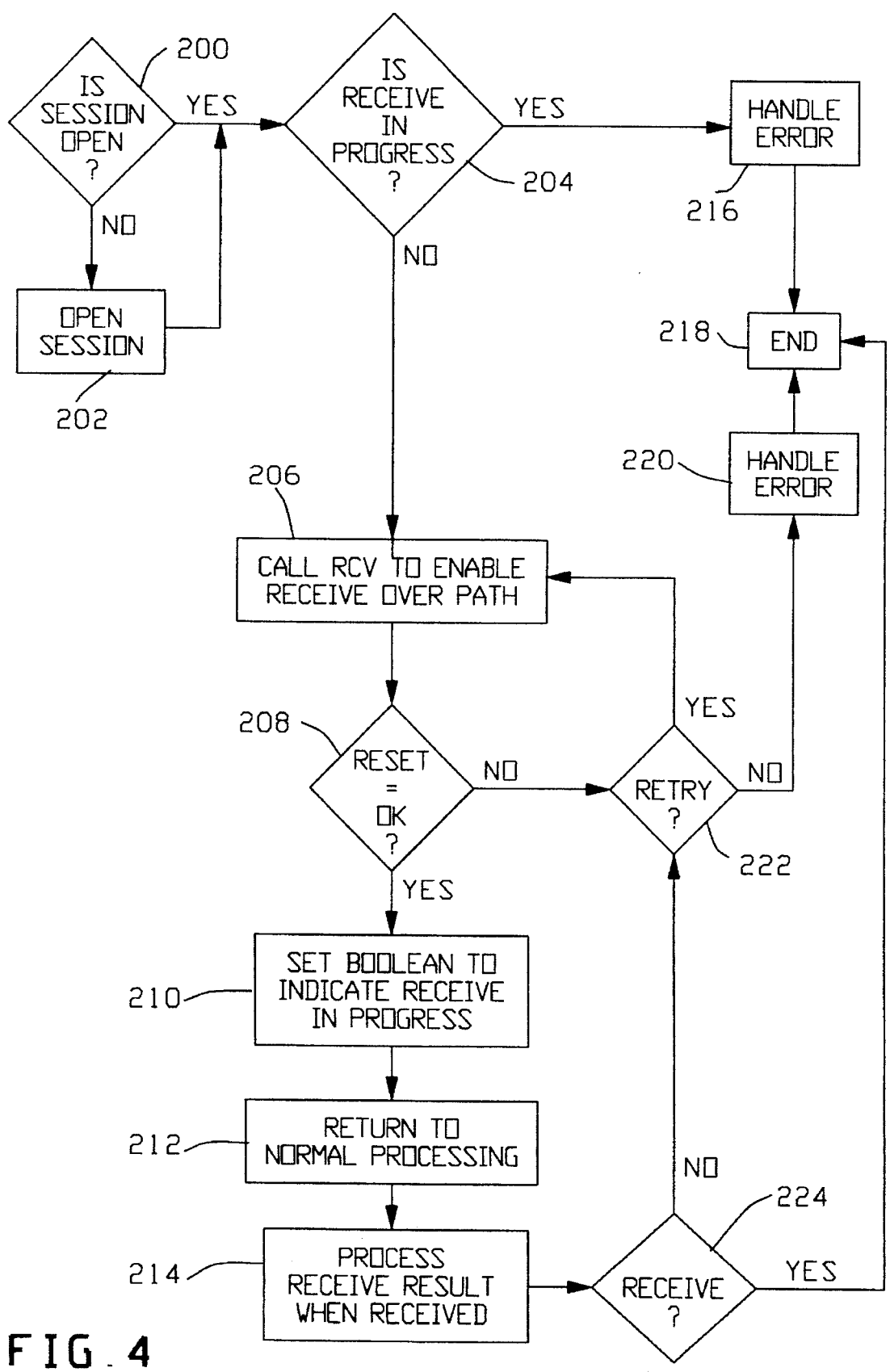

FIG. 4, shows the method used for receiving data with the present invention as shown by this example. Logically, the steps shown are identical to those shown in FIG. 3, except that receive oriented procedures and events are used instead of transmit oriented ones.

Figure 5:
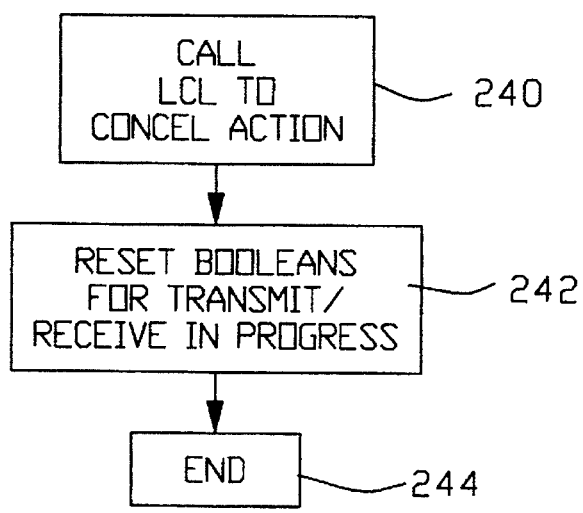

FIG. 5 is an example of how to cancel an outstanding request over the session path with this invention. A call to LCL 240 terminates any outstanding transmit or receive requests for the specified path. The accessory then resets any booleans 242 that indicate a request was outstanding for the path and the process ends 244.

Figure 6:
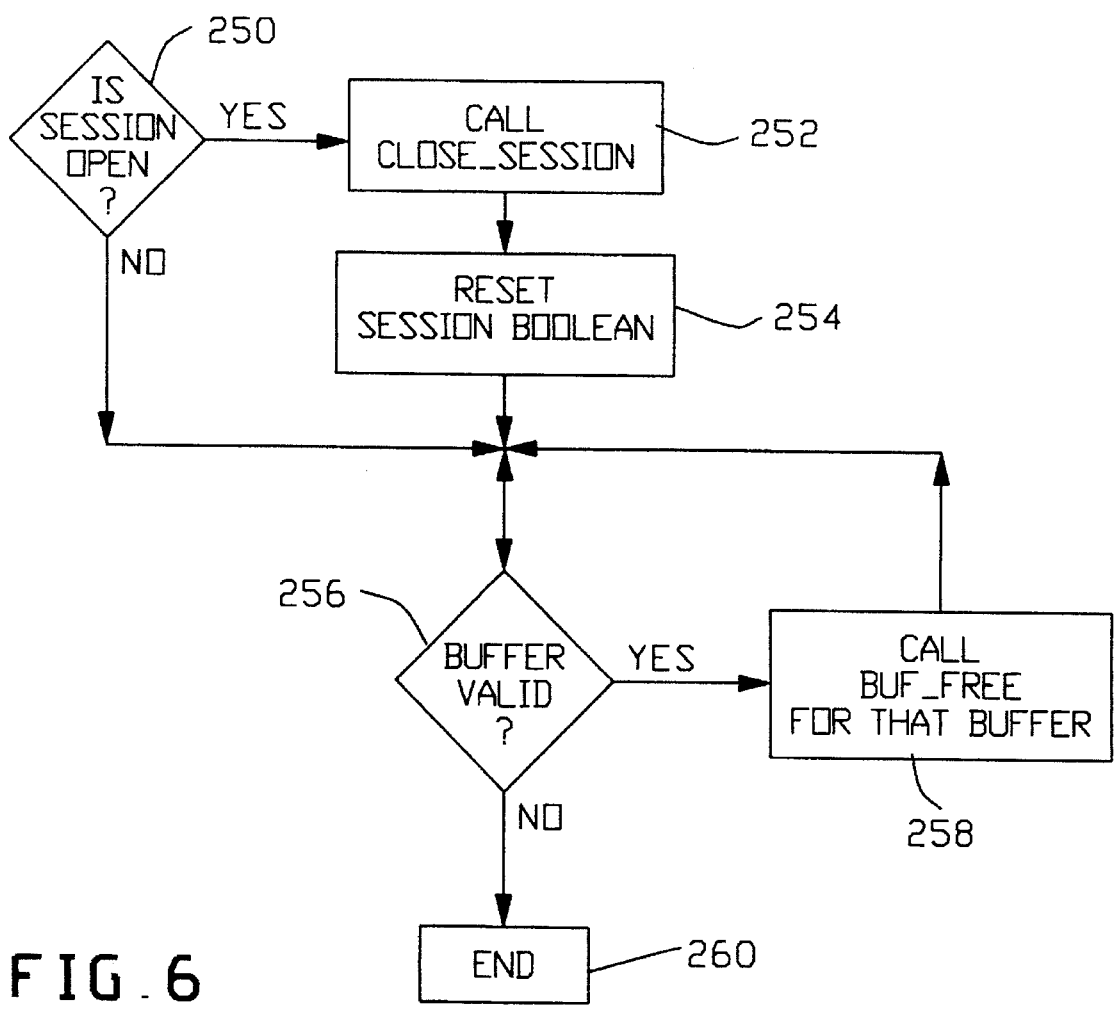
FIG. 6 is a logic diagram depicting the steps an accessory performs to close a path.

When the use of a session path has ended and the accessory no longer requires the path, the path should be closed in the manner shown by FIG. 6. First 250, a check is made to determine if the session path is open. If not, the process determines if there are any valid buffers associated with the path. If so, the buffers are released by calling BUF_FREE 258.

If the check 250 indicates the session is open, the process calls CLOSE_SESSION 252 and resets the boolean indicating an open session 254. The process then proceeds to deallocate buffers 256 as described before and the close session completes 260.

At the modifier level and at the worker level there are defined for the invention a series of interfaces to which developers must adhere if they write programs to fit into the invention at one of these levels. At the accessory level, it is up to the accessory to call each of the defined interfaces in the correct manner in order to accomplish communication over the path. Once the accessory begins an action, control of the action is assumed by the manager. In order to accomplish this the manager calls a specific set of interfaces defined for the modifier and protocol interface levels.

These interfaces provide the ability to perform the following functions:

- initialize the system
- configure a path; identify a path;
- open a session path; close a session path;
- transmit a message; receive a message; cancel a message.

Certain other miscellaneous functions are also provided by the manager in this implementation such as the ability to:

- handle an event;
- handle an error message; handle an error.
- identify a session; determine session information; modify session information.

Figure 7A:
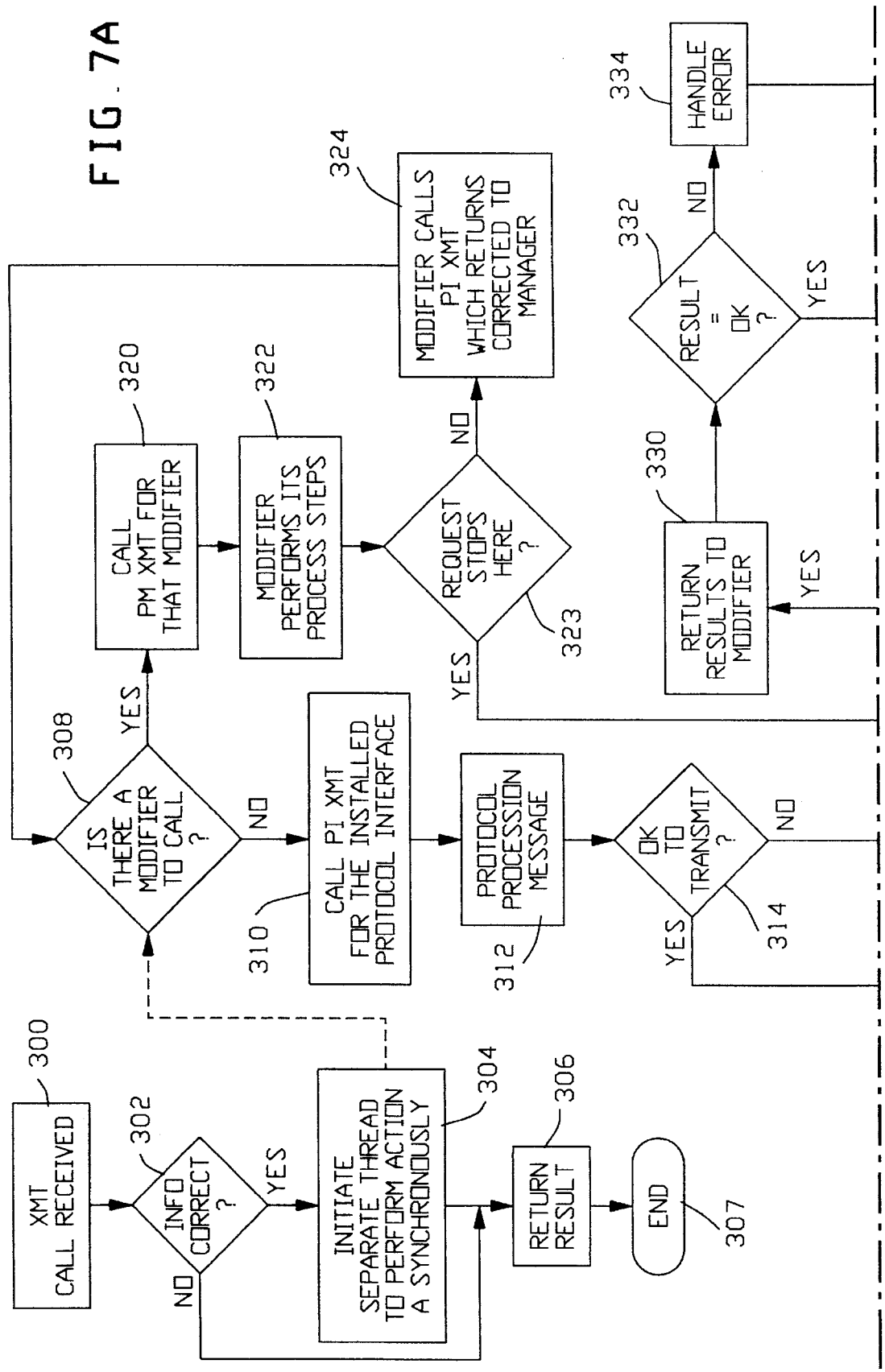

An example of how these are used by the presently disclosed invention, is given in FIGS. 7, 7A and 7B which is an example of the steps involved to accomplish a transmit for the manager, modifier and protocol interface portions of this example of this invention. The accessory's call to XMT is received by the manager 300 which performs a preliminary verification of the transmit request 302. If it is a valid request, the manager posts a message to its own message queue 304 to perform a transmit. If an error is detected by the verify 302 or once the message 304 is posted, the manager returns the result to the accessory 306. The accessory resumes processing until a final transmit result is received.

The system starts a separate execution thread in the manager's window function to process the message posted 304. The method used initiate such a thread is known in the art to depend upon the characteristics of the system upon which the thread is to execute. First 308, the manager checks the session path definition to determine what modifier interface program, if any, should be invoked. If one is installed, the manager calls the modifier function PmXMT 320 and passes in the accessory's buffer handle. This invokes the procedure at the modifier level to begin the transmit.

The modifier processes the message in the buffer 322 and can even allocate and pass a new buffer to the interface, if appropriate. At the completion of all its processing the modifier determines if the request should continue down the path 323. If not, the modifier returns the result to the manager 328. If the request should continue, the modifier calls PiXMT 324. In this invention, this routes control back to the manager which repeats step 308 to determine if other modifier interface programs need be invoked. If so, steps 320, 322, and 323 are repeated until all such modifiers have been called.

This routing of all standard interface calls, some of which may have multiple instantiations, back to the manager is one of the key features of this invention. This permits procedures with the same procedure interface to coexist within the same overall application. It is the manager's responsibility to then route these calls correctly for a given path.

When no modifiers remain to be called, the manager calls PiXMT 310 to pass control to the protocol interface program defined for the path. It is the protocol interface that initiates a transmit across the lower communication layers. After any required processing of the buffer 312, the program checks to see if a transmit may be attempted 314. If not, the program returns an error 326 which returns control to the manager at step 328. If step 314 determines a transmit is possible, the process initiates the transmit 316 and returns OK 318 to the manager also at 328. The manager now checks to see if there are any modifiers to which to return the result of the transmit 328. The order of these returns is the inverse of the order in which the modifiers were originally invoked. If there is a such a modifier, the result is returned to it 330. The modifier checks if the result indicates success 332 and if not, the error is handled 334. After handling the error or if the result indicates success, the result is returned to the manager 336 where these steps are repeated from step 328 until no more modifiers to which to respond remain. When all modifiers have received a response, the manager proceeds to check the result 338. If there is an error, it is handled 340 and an event is queued to the accessory 342 as notification of the error. At this point the processing of the transmit ends 344.

Figure 8B:
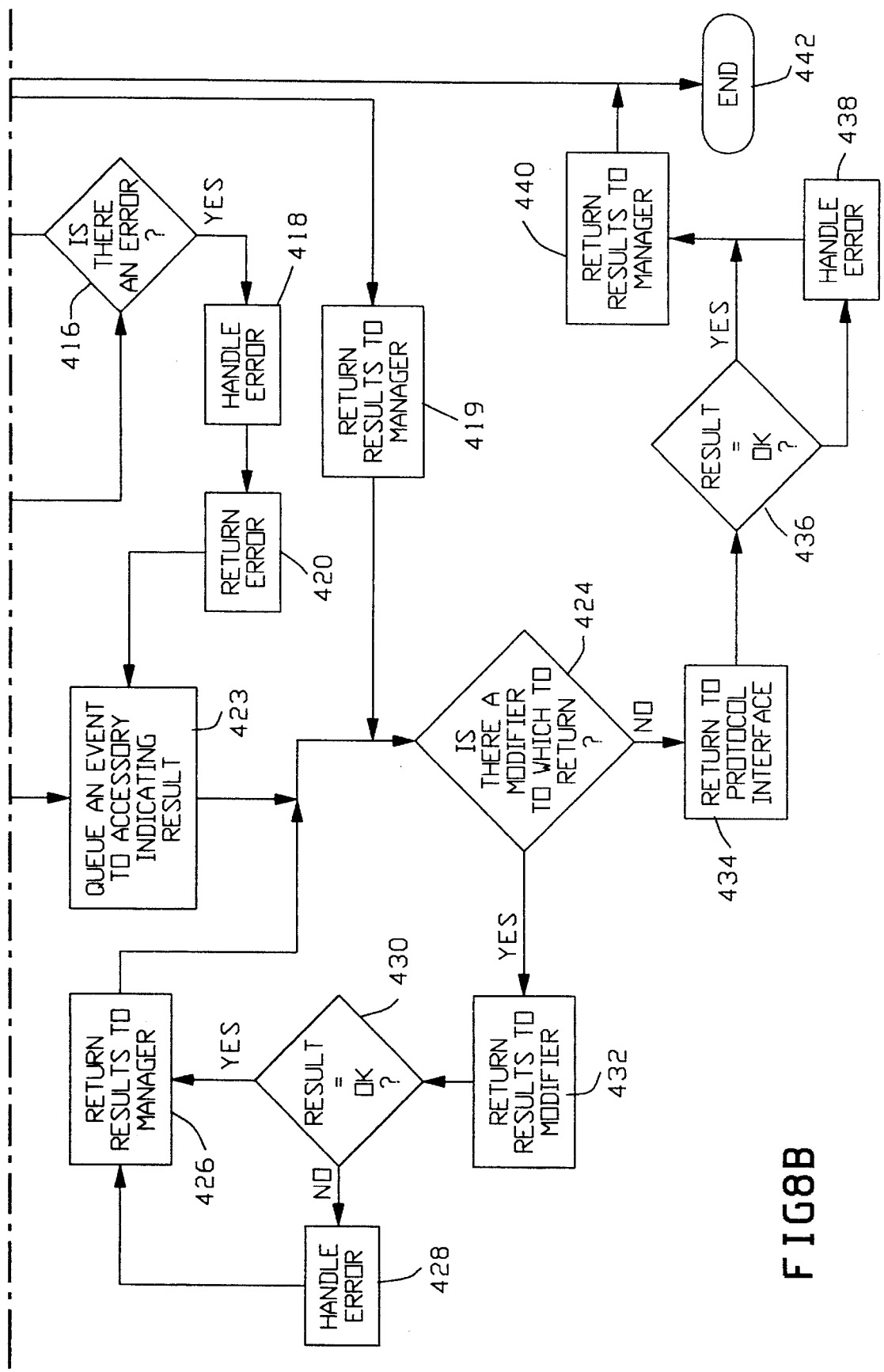

The steps to handle the result of a communication action are shown in FIGS. 8, 8A and 8B. Processing begins when the protocol interface receives notification from the low-level driver of a communication action 400. This could be the receipt of a message while in receive state or the result of a transmit initiated by the protocol interface at some earlier time. Exactly how this is done will depend on the implementation of the particular interface. The timer code shown in the appendix is just one possible implementation. This routine might have been registered earlier by the interface, perhaps during the PiInstall, and it periodically polls the status of all datacomm requests.

Using the completion of a transmit as an example, the protocol interface determines that the transmit is done and checks the result 402. If there is an error, the interface handles it 404, which may include reissuing the transmit. Next, the protocol interface determines if any further notification of the error to other levels is necessary 406. If not, processing ends 442.

If notification is necessary, or if the transmit was determined to be successful, the protocol interface calls PmEVENT 408 to begin the chain back up the path. This transfers control to the manager which determines if there is a modifier defined for the path which should receive this notification 410. If so, the manager invokes the appropriate modifier by calling its PmEVENT 412. The modifier performs its processing steps 414 and verifies their success 416. If successful, the modifier determines if the request should continue down the path 417. If not, the modifier returns the result to the manager 419. If the request should continue, the modifier calls EVENT 422 which returns control to the manager at step 410. If no errors occur, these steps repeat until all modifiers in the chain have been called. If an error is detected at step 416, the modifier handles the error 418 and returns an error result to the manager 420.

When no modifiers remain to be notified, or when an error result is returned by a modifier, the manager posts an event 423 to the accessory which initiated the original transmit. Such event handling is known in the art. Next, the manager checks the chain of modifiers to see if any require a result to be returned 424. If so, the manager returns such a result 432. The modifier checks the result 430, handles an error if one occurred 428, and returns the result 426 to the manager. The process returns to step 424 and repeats the above steps until no modifiers which require a result remain. The manager then passes the result to the protocol interface 434. The result is checked 436, any error is handled 438, the result is returned to the manager 440, and the process ends 442.

Figure 9:
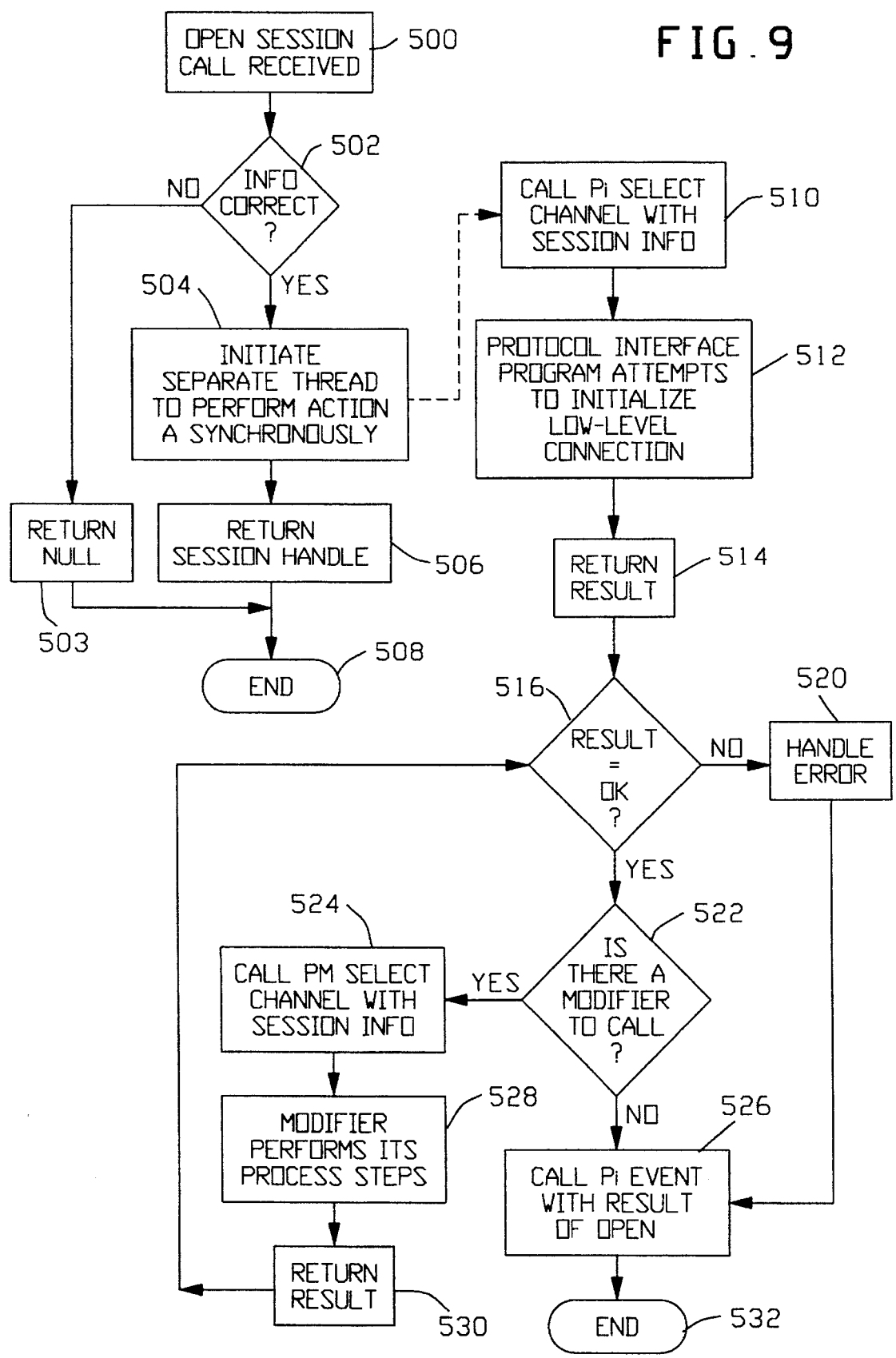
FIG. 9 is a logic diagram illustrating the steps taken by the manager, modifier, and accessory levels of the presently disclosed method to open a path.

Another example of the interaction between the manager, the modifier and protocol interface level programs is shown in FIG. 9 which is an example of a session establishment. The accessory's call to OPEN_SESSION is received by the manager 500 and it includes the name of the path to open. The manager preliminarily verifies the open request 502. If the request is correct, the manager posts a message to its own message queue 504 and returns the pending session handle to the accessory 506. If the request is incorrect, the manager returns a null pointer 503 and the process ends 508. If a session handle is returned, the accessory continues normal processing but does not attempt to use the path until a session open event is received.

The system starts a separate execution thread in the manager's window function to process the message posted in step 504. The method used initiate such a thread is known in the art to depend upon the characteristics of the system upon which the thread is to execute. The manager looks up the path name and calls PiSELECTCHANNEL 510 with the session handle, channel index, and configuration record associated with the specified path. The protocol interface performs the steps required to open this path 512. Examples of such steps are dialing a modem over a communications port or broadcasting a message across the network. When the process is complete, the interface returns the result to the manager 514.

Next, the manager checks the result 516 and if there is an error, the manager handles it 520 and processing continues at step 526. If there is not an error, the manager checks the path definition 522 to see if there is a modifier which must be invoked. If so, the manager calls PmSELECTCHANNEL 524 with the session handle, channel index, and configuration record associated with the specified path. The protocol modifier performs open session processing 528 and returns the result to the manager 530. The manager checks this result 516 and, as long as no error occurs, repeats the process described above for any other modifiers defined for the path.

When the execution at the modifier level is completed, or when an error has occurred, the manager begins the process of notifying the programs in the path about the result of the open session by calling PiEVENT 526. The event is passed through the architecture as described in FIGS. 8, 8A and 8B, starting with protocol interface level. The protocol interface sees the event, responds appropriately and passes the event to the protocol modifier level. Eventually, the accessory receives the session event. If the open was successful, the accessory level process can now begin to allocate buffers and begin sending data across the session path.

Figure 10A:
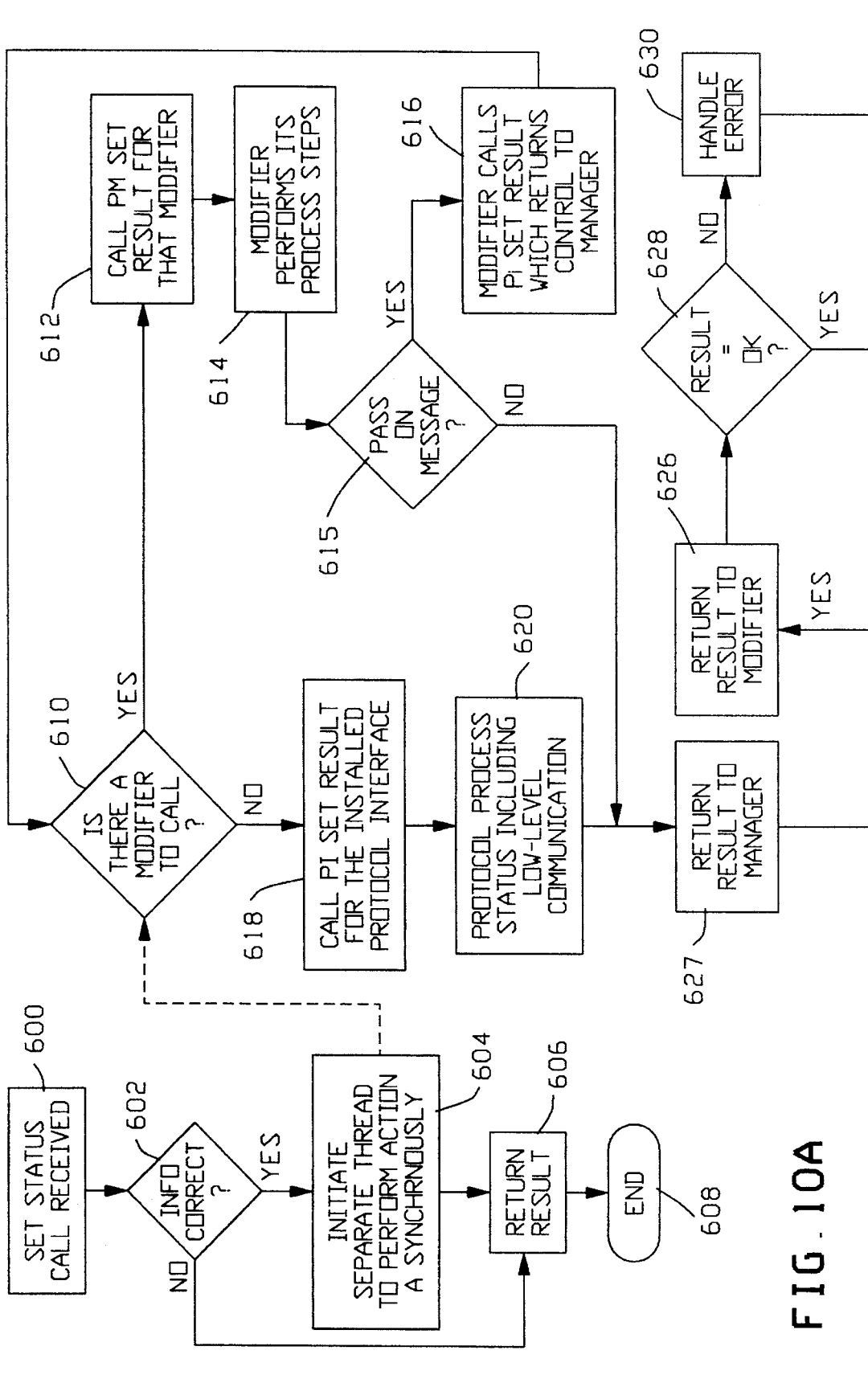
FIGS. 10, 10A and 10B are logic diagrams which depict depicting the steps taken by the various levels of the presently disclosed method to set the status for a path.
Figure 10B:
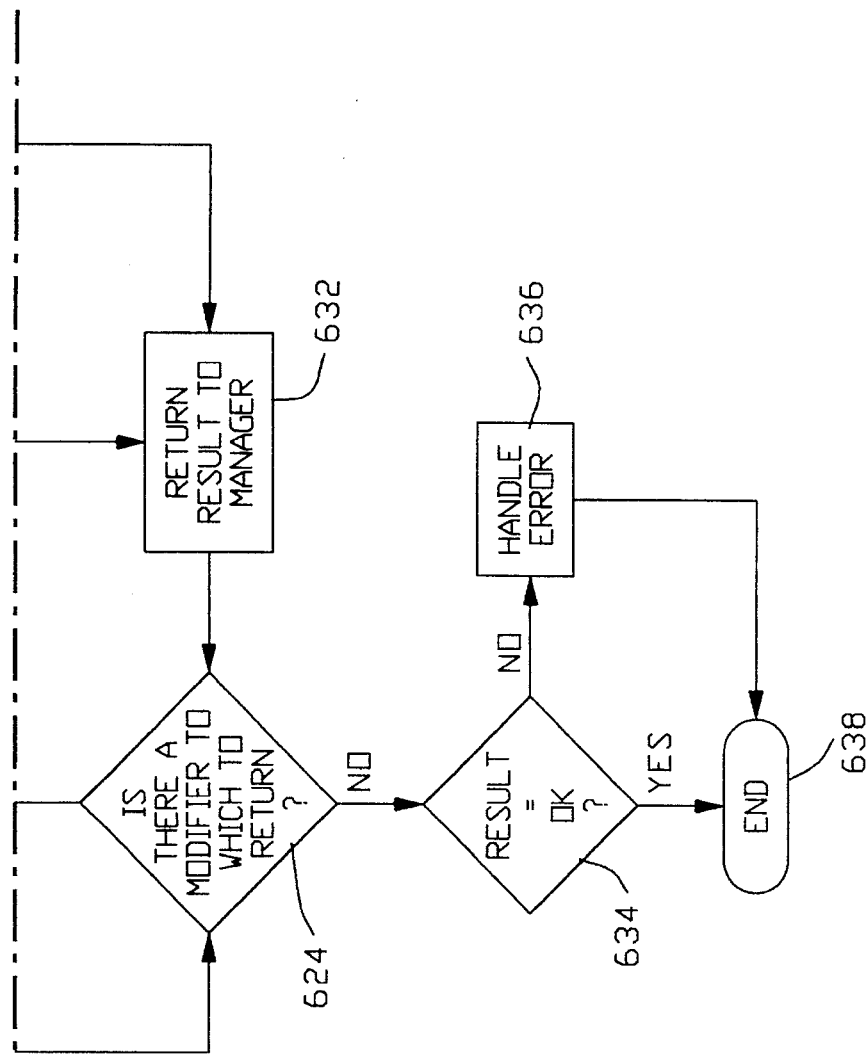
Figure 10:
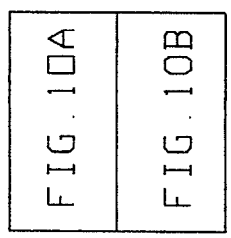

The action of closing a session is similar to that described above and it would be redundant to go through the steps individually. In addition, FIGS. 10, 10A and 10B contain an example of the process of handling status events initiated by the accessory.

Another important feature of this invention is that it provides the ability to configure a path dynamically. The process for accomplishing this is shown in the flow chart of FIG. 11. The process begins when the manager receives a call from the accessory to perform a path configuration 700. The manager gets a list of modifier and protocol interface modules which will form part of the path as provided by the user 702. Part of this step is to perform version checking to verify that the modules specified by the user are compatible with this version of the manager. If the modules are compatible, the manager calls PmCONFIGPATH to begin initializing these modules 714.

Using the above mention list, the manager checks to see what modifier, if any, is to be invoked 716. If one exists, a call to its PmConfigPath is made 726 which passes control to the modifier. The modifier may then query the user 728 to gather additional path information as necessary. The modifier performs any appropriate initialization 730 and returns the information and control to the manager 732. The manager stores the returned information as part of the path definition 736 and repeats the steps at 716 to determine if another modifier must be called.

When all modifiers defined for the path have successfully completed initialization, the manager calls PiCONFIGPATH 718 to invoke the protocol interface defined for the path. The protocol interface attempts to initialize 720, which may include communication with the low-level driver or other program. When complete, the protocol interface returns information concerning the path to the manager 722, which the manager stores as before. Assuming all steps completed properly, the manager returns a configuration handle to the calling accessory 724 to be used to identify the path and the process ends 734.

Having described how the overall architecture is designed, it is now necessary to more specifically describe the interfaces involved at the modifier/protocol level. Basically, a protocol or modifier interface program must include each of these interfaces in order to behave correctly within the invention. An example of how these might be implemented is as a dynamic link library that exports this set of interfaces as functions.

The motivation for implementing an action at the modifier or protocol interface level is generally to make the function more easily reused and combined by other accessories. Such implementations are generally smaller and more structured than those at the accessory level. An example of a task suitable for protocol/modifier implementation is the filter of a data stream. Specifically, implementing a conversion routine for all lower case ASCII characters in the incoming data to make them upper case. At the modifier level the code can be easily reused by other applications.

A more sophisticated use of a modifier is to create a multiplex communication path which is conducting two or more concurrent conversations over a single communications connection. A multiplexing modifier receives all the messages associated with a given channel. These messages all have the same channel index. The multiplexing modifier then employs its custom method of determining which path the message should take. If the message is destined for an accessory, the modifier calls PmEvent with the session handle of the appropriate path to forward the message. If the message is to go out over the channel, the modifier formats and tags it as appropriate to identify its source and forwards it as normal.

An advanced use of this multiplexing is where a modifier performs transmits and receives without the accessory's knowledge. This might be used to notify the application at the other end of the path which session is active.

The following paragraph provides a short description of each of the necessary interfaces for the protocol interface/ modifier level. The "-" in each of the following names is simply a placeholder. If the program is implemented at the modifier level, the "-" is actually an "m". For a protocol interface program, the "-" is an "i".

P-INSTALL. This procedure is called once by the connectivity manager when the modifier/protocol interface is first loaded. This is where the majority of the initialization necessary for your modifier/protocol interface should be performed. The manager passes in a context ID as a parameter which is used during error and status processing. If the initialization completes successfully the program should return OK to the manager.

P-TERMINATE. This procedure is called once by the manager when all communication services are being closed and the modifier/protocol interface is no longer needed. The majority of any resource cleanup associated with termination of the interface should be performed here. If the termination completes successfully, OK is returned to the manager.

P-CONFIGPATH. This procedure is called during path configuration when the user dynamically associates a modifier/protocol interface with the specified path. If the user is modifying an existing path the current configuration information is passed in via a buffer handle. If the modifier/ protocol interface requires additional information from the user, it should be retrieved using a dialog box of a type appropriate for the given environment.

In order to provide a degree of plug compatibility and version compatibility over time, each interface and modifier should do its own version checking of the configuration record. If there is a change in the size or layout of the configuration record from one version to the next, the modifier/protocol interface should be written to recognize old versions of the record. The version control provided by the manager only insures that compatible levels of the manager and the modifier and protocol interfaces are running.

The P-CONFIGPATH procedure should return a handle that identifies the buffer containing the new or modified configuration record, if one exists. Any memory allocated for the configuration record should be allocated using the standard buffer allocate procedure BufferAlloc. The configuration record may be any length required but should be prefixed with the ConfigHeader typedef provided by the invention. Sample code of an initialization is provided in the appendix of this application.

P-SELECTCHANNEL. This function is called to initialize a session path and should be used to create and initialize session related data. When an accessory makes an open session request it eventually results in a call to this procedure. See the earlier described open session process of FIGS. 8, 8A and 8B for more details. Details about the underlying session layer may be acquired by calling the GetInfo interface of the manager. If the program is a protocol interface, the interface should simply set the channel to the idle state and wait for the SESSION_ESTABLISHED event to be passed to it. Return OK if the action completes successfully.

P-DESELECTCHANNEL. This function is called to terminate a session path. All session related data and resources should be deallocated in this procedure and OK returned if cleanup is successful.

P-LCL. This procedure is used to cancel any outstanding communication action.

P-RCV. This procedure is called to permit a receive of a message into the specified buffer.

P-XMT. This procedure is called to initiate the transmission of a data buffer.

P-SETRESULT. This function is used to pass the status and error values to other components within the architecture that were initiated by the accessory.

P-EVENT. This function allows lower components to process events passed from a lower layer in the architecture. After processing the event it must be passed to the next layer in the architecture. Successful completion of any processing should be noted with an OK.

P-SETINFO. This function is called to build an information record that describes the current session attributes. It is the protocol interface that is responsible for initializing all fields in this attribute record structure. The programs at the modifier interface level, should modify only those attributes which pertain to the task of the modifier. Return OK if all processing is successful.

P-IDENTIFYSESSION. This function is called once for each session to retrieve a unique session identifier. It is primarily intended for multiplexing modifier/protocol interfaces that support multiple sessions over a single channel. If the modifier/protocol interface program supports this function, it should return a unique alphanumeric identification string. Otherwise, return null.

P-GETSTRING. This function retrieves the text associated with a given Result. Every error must have an associated string for display to the user. The null terminated text is placed in the buffer that is passed in by this call.

Having described the set of interfaces that are part of the manager for accessories to invoke, and having described a set of interfaces that are expected to be part of any modifier/ protocol interface level program, the final portion of the invention interfaces that must be described are those utilities that are part of the manager. Obviously, each of the interfaces described above for the modifier/protocol levels must also be part of the manager. This is because the manager intercepts each of these calls and determines where to actually route a given call. In addition, the manager provides the following interfaces exclusively. Again, each interface will be mentioned in a short description given in the following text. A structured example of the use of each of these interfaces in a programming context can be found in the appendices included with this application.

BufferAlloc. This function allocates a global buffer in the manager's thread. It should be used to allocate all global buffers. The procedure returns a handle to the buffer if memory is allocated. Otherwise, null is returned.

EVENT. This procedure posts a message to the application associated with the given session. It is used by modifier/protocol interface level programs to notify an accessory of events.

FreeBuffer. This function frees the memory associated with a buffer previously allocated through BufferAlloc.

GetInfo, this procedure allows the modifer/protocol interfaces access to the session data of lower levels.

ReAllocBuffer. This function reallocates memory previously created through BufferAlloc. This provides a resizing method for a previously allocated buffer.

RunHelp. This procedure runs the help system.

SetSessionError. This procedure must be used when returning standard error results to ensure that the correct library is associated with the given error. This procedure may also be useful in returning program specific errors as it alleviates the library from managing the information itself.

GET_RESULT_CONTEXT. This macro extracts the value of the context from the given RESULT.

GET_RESULT_TYPE. This macro extracts the type from the given RESULT.

GET_RESULT_VALUE. This macro extracts the result value from the given RESULT.

MAKE_RESULT. This macro creates a RESULT from the given values for context type and result.

While the invention will be described in the context of certain preferred embodiments, it is not intended to limit the invention to only those specific embodiments. Those skilled in the art will recognize that variations and modifications may be made to the present invention without departing from the spirit and scope of the invention as claimed.

Following are appendices I–III which present examples of the code for a program for each of the previously described levels of the design of this invention.

APPENDIX I

```
/*              Sample INFOConnect XVT application           */
/*                                                           */
/*************************************************************/

/*

What is the purpose of this sample?

1) Provide a template for application development.

The source files used for this sample can be used as
      a starting point for INFOConnect/XVT cooperative
      applications.

This sample can also be built to verify the proper
      installation of your development environment.

2) Demonstrate a portable application.

XVT functions are used for all presentation services.
      INFOConnect is used for all data communications.
      No system-specific calls are made (ie. Windows or DOS).

3) Demonstrate techniques for managing datacomm buffers.

This sample follows the recommended techniques for
      managing buffers during error handling, application
      termination, etc.

What does this sample program do when it is run?

This application opens an INFOConnect Session and displays
   any messages received in a message box. If a key is
   pressed, the user is prompted for a message to transmit.

*/ define ICXVT              /* Allow INFOConnect calls    */
include <xvt.h>
#include <xvtmenu.h>
#include "icxvtapp.h"

IC_SESSHND hSession = NULL_IC_SESSHND;
IC_BUFHND hXmtBuf = NULL_IC_BUFHND;
IC_BUFHND hRcvBuf = NULL_IC_BUFHND;
BOOLEAN bSessionEst = FALSE;
BOOLEAN bFocusNotify = FALSE;
IC_SINFO sinfo;
IC_RESULT icerror;
unsigned uBufsize;
char sWindowHdr[256];
char sNoteBuf[256];
```

```
char sPrompt[256];
char sFormat[256];

int nXmtTries = 0;
int nRcvTries = 0;

#define MAXRETRIES 5
#define MAXBUFSIZE 4096
#define HSESSION (ep->v.ic.session)
#define ICRESULT (ep->v.ic.v.result)
#define MaxICPathSize (IC_MAXCONNECTEDPATHIDLEN + 1)

#if ((XVTWS == WINWS) || (XVTWS == PMWS))
   extern char far *npw_cmdline;   /* Command Line */
endif /* Prototypes for local functions */
void handle_ic_error(WINDOW, IC_SESSHND, unsigned,
                     IC_RESULT);
BOOLEAN cmdline_get_path (STR_FAR, STR_FAR, unsigned);

BOOLEAN appl_init()
{
   /* Appl_init is required in all XVT apps. */ char ICPath[MaxICPathSize];

set_cur_window(std_win);

/*  Initialize INFOConnect Interfaces */
   icerror = ic_init_ics(IC_VERSION, IC_REVISION);
   if ( icerror != IC_OK) {
      handle_ic_error( std_win, NULL_IC_SESSHND,
                     NULL, icerror);
      return(FALSE);
   }

/*
      Open an INFOConnect Session.
      Use path name from the command line, if specified.
      Otherwise, have INFOConnect prompt the user.
   */
   if (cmdline_get_path(npw_cmdline, ICPath, sizeof(ICPath)))
      icerror = ic_open_session(std_win, ICPath, &hSession);
   else
      icerror = ic_open_session(std_win, NULL, &hSession);
   if (icerror != IC_OK) {
      handle_ic_error( std_win, NULL_IC_SESSHND,
                     NULL, icerror);
      return( FALSE);
   }
   get_res_str(WINDOW_HDR, sWindowHdr, sizeof(sWindowHdr));
```

```
      get_res_str(RCV_MSG_PREFIX, sFormat, sizeof(sFormat));
      return(TRUE);
} void main_event(WINDOW win, EVENT * ep)
{
   /*
      Main_event is required in all XVT apps.
      All XVT events are listed first,
      followed by INFOConnect events.
   */

STR_FAR buf;
   IC_BUFHND hSessionName;
   STR_FAR pSessionName;
   char sSessionName[IC_MAXSESSIONIDLEN];

switch (ep->type) {

/*********************************************************/
   /* Standard XVT events are shown first.                  */
   /*********************************************************/ case E_COMMAND:
      switch (ep->v.cmd.tag) {
      case M_FILE_NEW:
      case M_FILE_OPEN:
      case M_FILE_SAVE:
      case M_FILE_SAVE_AS:
         break;
      case M_FILE_QUIT:
         terminate();
         break;
      }
   case E_CHAR:
      /* Request a message to Transmit */
      if ((nXmtTries>0) || (!bSessionEst)) {
         get_res_str(XMT_NOT_DONE,
                     sNoteBuf,
                     sizeof(sNoteBuf));
         note(sNoteBuf);
      }
      else {
         get_res_str(DEFAULT_XMT_MSG,
                     sNoteBuf,
                     sizeof(sNoteBuf));
         get_res_str(DEFAULT_XMT_PROMPT,
                     sPrompt,
                     sizeof(sPrompt));
         get_str_response(sPrompt,
                          sNoteBuf,
                          sizeof(sPrompt));
```

```
            buf = ic_buf_lock(hXmtBuf);
            gmemcpy(buf, sNoteBuf, (long)sizeof(sNoteBuf));
            ic_buf_unlock(hXmtBuf);
            icerror = ic_xmt(hSession, hXmtBuf,
                             gstrlen(sNoteBuf));
            if (icerror == IC_OK)
                nXmtTries = 1;
            else
                handle_ic_error( win, hSession, NULL, icerror);
         }
         break;

case E_UPDATE:
         /* Paint the application window */
         {
            DRAW_CTOOLS tools;
            RCT rct;

set_cur_window(win);
            get_normal_ctools(&tools);
            tools.font = normal_font;
            tools.pen.pat = PAT_HOLLOW;
            tools.opaque_text = TRUE;
            set_draw_ctools(&tools);
            get_client_rect(win,&rct);

/* Clear the window and write some text */
            draw_rect(&rct);
            draw_text(10, 30, sWindowHdr, -1);
         }
         break;

case E_ACTIVATE:
         if ((bFocusNotify) && (bSessionEst) ) {
            if (ep->v.active)
                icerror=ic_set_status(hSession,IC_REACTIVATE_ON);
            else
                icerror=ic_set_status(hSession,IC_REACTIVATE_OFF);
            if (icerror != IC_OK)
                handle_ic_error(win, hSession, NULL, icerror);
         }
         break;

case E_QUIT:
         if (ep->v.query)
            quit_OK();
         else
            terminate();
         break;

/**********************************************************/
/* The following events are generated by INFOConnect */
```

```
/****************************************************/ case E_IC_SESSION_EST:
      assert(HSESSION==hSession); /* bad session */
      if (ICRESULT != IC_OK) {
         handle_ic_error (win, HSESSION, ep->type, ICRESULT);
         ic_close_session(HSESSION);
      }
      else { /* session establishment was successful */
         icerror = ic_get_session_info( HSESSION, &sinfo);
         if (icerror != IC_OK)
            handle_ic_error( win, HSESSION, NULL, icerror);
         bFocusNotify = sinfo.focus_notify;

/* Display session name */ hSessionName = ic_buf_alloc((long)IC_MAXSESSIONIDLEN);
         icerror = ic_get_session_name(HSESSION,
                                       hSessionName,
                                       IC_MAXSESSIONIDLEN);
         if (icerror != IC_OK)
            handle_ic_error( win, HSESSION, NULL, icerror);
         pSessionName = ic_buf_lock(hSessionName);
         gmemcpy(sSessionName, pSessionName,
                 (long)IC_MAXSESSIONIDLEN);
         ic_buf_unlock(hSessionName);
         ic_buf_free(hSessionName);
         set_doc_title(std_win, sSessionName);

/* Allocate INFOConnect buffers. */ uBufsize = min((unsigned)sinfo.max_size, MAXBUFSIZE);
         hXmtBuf = ic_buf_alloc( (long)uBufsize);
         hRcvBuf = ic_buf_alloc( (long)uBufsize);

assert(hXmtBuf!=NULL_IC_BUFHND);
         assert(hRcvBuf!=NULL_IC_BUFHND);
         bSessionEst = TRUE;
         icerror = ic_rcv( hSession,hRcvBuf,uBufsize);
         if (icerror == IC_OK)
            nRcvTries = 1;
         else
            handle_ic_error( win, HSESSION, NULL, icerror);
      }
      break;

case E_IC_SESSION_CLOSE:
      /*
         Calling terminate() from here results in an orderly
         termination if the user clears your application's
         session from the INFOConnect status window.
         If your application can stay active in this
```

```
            situation, don't call terminate() from here.
         */
         assert(HSESSION==hSession);
         hSession = NULL_IC_SESSHND;
         terminate();
         break;

case E_IC_STATUS:
         assert(HSESSION==hSession);
         break;

case E_IC_XMT_DONE:
         assert(HSESSION==hSession);
         nXmtTries = 0; /* no outstanding transmits */
         if (nRcvTries == 0) {
            icerror = ic_rcv( HSESSION, hRcvBuf, uBufsize);
            if (icerror == IC_OK)
               nRcvTries = 1;
            else
               handle_ic_error( win, HSESSION, NULL, icerror);
         }
         break;

case E_IC_RCV_DONE:
         /* Display the received message */
         assert(HSESSION==hSession);
         nRcvTries = 0; /* no outstanding receives */
         buf = ic_buf_lock(ep->v.ic.v.rcv.buffer);
         gmemcpy((STR_FAR)sNoteBuf,
                 (STR_FAR)buf,
                 (long)ep->v.ic.v.rcv.length);
         sNoteBuf[ep->v.ic.v.rcv.length] = 0;
         note(sFormat, sNoteBuf);
         ic_buf_unlock(ep->v.ic.v.rcv.buffer);
         icerror = ic_rcv(HSESSION,hRcvBuf,uBufsize);
         if (icerror == IC_OK)
            nRcvTries = 1;
         else
            handle_ic_error( win, HSESSION, NULL, icerror);
         break;

case E_IC_XMT_ERROR:
         assert(HSESSION==hSession);
         if (++nXmtTries > MAXRETRIES) {
            handle_ic_error( win, HSESSION, ep->type, ICRESULT);
            nXmtTries = 1;
         }
         /* try again */
         icerror = ic_xmt( HSESSION, hXmtBuf,
                           gstrlen(sNoteBuf));
         if (icerror != IC_OK) {
            handle_ic_error( win, HSESSION, NULL, icerror);
```

```
            nXmtTries = 0;
         }
         break;

case E_IC_RCV_ERROR:
         assert(HSESSION==hSession);
         if (++nRcvTries > MAXRETRIES) {
            handle_ic_error( win, HSESSION, ep->type, ICRESULT);
            nRcvTries = 1;
         }
         /* try again */
         icerror = ic_rcv( HSESSION,hRcvBuf,uBufsize);
         if (icerror != IC_OK) {
            handle_ic_error( win, HSESSION , NULL, icerror);
            nRcvTries = 0;
         }
         break;

case E_IC_ERROR:
         assert(HSESSION==hSession);
         handle_ic_error( win, HSESSION, ep->type, ICRESULT);
         break;

default:
         break;
      }
} void appl_cleanup()
{
   /*
      Appl_cleanup is required in all XVT apps.
      Release all INFOConnect resources.
   */
   bSessionEst = FALSE;
   if (hSession != NULL_IC_SESSHND) {
      ic_close_session(hSession);
   }
   if (hXmtBuf != NULL_IC_BUFHND) {
      ic_buf_free(hXmtBuf);
      hXmtBuf = NULL_IC_BUFHND;
   }
   if (hRcvBuf != NULL_IC_BUFHND) {
      ic_buf_free(hRcvBuf);
      hRcvBuf = NULL_IC_BUFHND;
   }
} void handle_ic_error(WINDOW      win,
                     IC_SESSHND  hSession,
                     unsigned    type,
                     IC_RESULT   icerror)
```

```c
{
    /*
        Pass all INFOConnect errors back to INFOConnect
        for the default action.

If you want to format and display the error
        message yourself, use ic_get_string instead
        of ic_default_error_proc.
    */
    ic_default_error_proc(win, hSession, type, icerror);
} define scan_blanks(ptr, len)                       \
        while ((len > 0) && (*ptr == ' ')) {        \
            ptr++;                                  \
            len--;                                  \
        }

BOOLEAN cmdline_get_path (STR_FAR  sCmdLine,
                          STR_FAR  sPath,
                          unsigned uPathSize)
{
    /*
        Returns TRUE if and only if an INFOConnect path
        has been specified in the command line. If TRUE
        is returned, the buffer pointed to by 'sPath', and
        whose size (including \0) is 'uPathSize', will
        return the null terminated path name, otherwise
        the buffer is not affected.
    */
    BOOLEAN  ok;
    STR_FAR  ptr;
    unsigned len;

ok = FALSE;

if (sCmdLine != NULL) {
        ptr = sCmdLine;
        len = gstrlen (sCmdLine);
        while (len > 0) {
            if (*ptr == '-') {
                ptr++;
                len--;
                if ((len > 0) &&
                    ((*ptr == 'p') || (*ptr == 'P'))) {
                    ptr++;
                    len--;
                    scan_blanks(ptr, len);
                    while ((len > 0) &&
                            (*ptr != ' ') &&
                            (uPathSize > 1)  ) {
                        ok = TRUE;
```

```
                *sPath = *ptr;
                sPath++;
                uPathSize--;
                ptr++;
                len--;
            };
            *sPath = '\0';
        };
    } else {
        ptr++;
        len--;
    };
  };
};

return ok;
}
```

APPENDIX II

```
/****************************************************************/
/* MODIFIER.C                                                   */
/*                                                              */
/*      Sample INFOConnect Protocol-Modifier                    */
/*                                                              */
/****************************************************************/

/*
   This sample can be used as a template for modifier
   development.  It contains all the required functions
   that a modifier DLL must provide.

This sample protocol-modifier is similar to the PASSTHRU
   modifier that is part of INFOConnect.  Messages are not
   altered in any way by this protocol-modifier.
*/ include        <windows.h>
include        <icwin.h>
#include        <icproto.h>
#include        "modifier.h"
#include        "modifier.hh"

/* ************************************************************* */
/* Global data and type declarations                             */
/* ************************************************************* */ typedef struct {
   IC_CONFIGHEADER hdr; /* required by INFOConnect */

/* Modifier-specific info is defined here */
} config_record;

typedef config_record FAR *LPCONFIG_RECORD;

typedef struct aSessionRec {
   struct  aSessionRec *pNextSessionRec; /* next in linked list */
   HANDLE  hSession;         /* session handle */
   config_record cr;
} SESSIONREC;

typedef struct aSessionRec *PSESSIONREC;

char HelpFile[] = "modifier.hlp"; /* online help file */
HANDLE hMyInstance;
HWND hMyParent;
IC_RESULT_CONTEXT MyContext;
PSESSIONREC pSessionNode;

#define INTERNAL_ERROR_1   1
#define INTERNAL_ERROR_2   2
define INTERNAL_ERROR_3   3 define BADSESSION_ERROR_1 1
```

```c
#define BADSESSION_ERROR_2 2
#define BADSESSION_ERROR_3 3
#define BADSESSION_ERROR_4 4
#define BADSESSION_ERROR_5 5
#define BADSESSION_ERROR_6 6

/* ********************************************************** */
/* Local support routines                                      */
/* ********************************************************** */ void NEAR *  GetMem(unsigned);
void         FreeMem   (void NEAR *);
IC_RESULT    ReturnInternalError(HANDLE hSession, unsigned errnum);
IC_RESULT    ReturnBadSessionError(HANDLE hSession, unsigned errnum);
IC_RESULT    AddSessionRec    ( HANDLE hSession, int nChannel,
                                HANDLE hConfigBuf );
IC_RESULT    DeleteSessionRec( HANDLE hSession );
PSESSIONREC  GetSessionRec    ( HANDLE hSession );

/* ********************************************************** */
/* Required INFOConnect functions                              */
/* ********************************************************** */

IC_RESULT FAR PASCAL IcPmInstall(IC_RESULT_CONTEXT context)
{
    /*
        This procedure is called once by INFOConnect
        when the library is loaded.

Return IC_OK if initialization is successful.

IcP-Install can only use standard errors to
        report problems.
    */

MyContext = context;
    hMyParent = IcGetMyParent();
    pSessionNode = NULL;
    return IC_OK;
}

IC_RESULT FAR PASCAL IcPmTerminate(void)
{
    /*
        This function is called once by INFOConnect when the
        library is no longer needed. Global cleanup can be
        done here.

Return IC_OK if cleanup completes OK.
    */

IC_RESULT icerror = IC_OK;

while ((pSessionNode != NULL) && (icerror == IC_OK))
        icerror = DeleteSessionRec(pSessionNode->hSession);
```

```
    hMyParent = NULL;

return icerror;
}

IC_RESULT FAR PASCAL IcPmSelectChannel(HANDLE   hSession,
                                       int      nChannel,
                                       HANDLE   hConfigBuf)
{
    /*
       This function is called to initialize a protocol
       modifier session.
       Return IC_OK for successful completion.
    */

PSESSIONREC pSession;
    IC_RESULT icerror;

if (!hConfigBuf)
        return ReturnInternalError(hSession, INTERNAL_ERROR_1);
    icerror = AddSessionRec(hSession, nChannel, hConfigBuf);
    if (icerror != IC_OK)
        return icerror;
    pSession = GetSessionRec(hSession);

/* Insert new code here ... */ return IC_OK;
}

IC_RESULT FAR PASCAL IcPmDeselectChannel(HANDLE   hSession,
                                         int      nChannel)
{
    /*
       This function is called to end a protocol modifier
       session.
       Return IC_OK for successful completion.
    */

PSESSIONREC pSession;
    IC_RESULT icerror;

pSession = GetSessionRec(hSession);
    if (pSession == NULL)
        return IC_OK; /* We must have already deleted it */

/* Insert new code here ... */

DeleteSessionRec(hSession);
    icerror = IC_OK;
}

IC_RESULT FAR PASCAL IcPmXmt ( HANDLE      hSession,
                               HANDLE      buffer,
                               unsigned    length    )
```

```c
{
    PSESSIONREC pSession;

pSession = GetSessionRec (hSession);
    if (pSession == NULL)
        return ReturnBadSessionError(hSession, BADSESSION_ERROR_1);

/* Insert new code here ... */ return IcPiXmt( hSession, buffer, length );
}

IC_RESULT FAR PASCAL IcPmRcv ( HANDLE   hSession,
                               HANDLE   buffer,
                               unsigned length   )
{
    PSESSIONREC pSession;

pSession = GetSessionRec (hSession);
    if (pSession == NULL)
        return ReturnBadSessionError(hSession, BADSESSION_ERROR_2);

/* Insert new code here ... */ return IcPiRcv( hSession, buffer, length );
}

IC_RESULT FAR PASCAL IcPmLcl ( HANDLE hSession, WORD type )
{
    PSESSIONREC pSession;

pSession = GetSessionRec (hSession);
    if (pSession == NULL)
        return ReturnBadSessionError(hSession, BADSESSION_ERROR_3);

/* Insert new code here ... */ switch (type) {
    case IC_LCL_RCV:
    case IC_LCL_XMT:
    case IC_LCL_RCVXMT:
        return IcPiLcl( hSession, type );
        break;
    default:
        return ReturnInternalError(NULL, INTERNAL_ERROR_2);
        break;
    }
}

IC_RESULT FAR PASCAL IcPmGetString(HANDLE hSession,
                                   IC_RESULT icresult,
                                   LPSTR buffer,
                                   unsigned length)
{
    /*
```

```
        There are no unique errors or statuses for this
        modifier. It should never be called.
    */

IC_RESULT_CONTEXT  iccontext;
    IC_RESULT_TYPE     ictype;
    IC_RESULT_VALUE    icvalue;

iccontext = IC_GET_RESULT_CONTEXT(icresult);
    ictype    = IC_GET_RESULT_TYPE(icresult);
    icvalue   = IC_GET_RESULT_VALUE(icresult);

switch (ictype) {
    default:
        break;
    }
    return ReturnInternalError(hSession, INTERNAL_ERROR_3);
}

IC_RESULT FAR PASCAL IcPmSetResult ( HANDLE     hSession,
                                     unsigned   uType,
                                     IC_RESULT  result)
{
    PSESSIONREC pSession;

pSession = GetSessionRec (hSession);
    if (pSession == NULL)
        return ReturnBadSessionError(hSession, BADSESSION_ERROR_4);
    return IcPiSetResult( hSession, uType, result );
}

IC_RESULT FAR PASCAL IcPmSetInfo( HANDLE     hSession,
                                  LPIC_SINFO sinfo )
{
    /*
        The protocol-interface must initialize all SINFO fields.
        The protocol-modifier should only change ones it is
        specifically going to manage.

See the INFOConnect Reference Manual for descriptions
        of the different attributes.
    */

PSESSIONREC pSession;

pSession = GetSessionRec (hSession);
    if (pSession == NULL)
        return ReturnBadSessionError(hSession, BADSESSION_ERROR_5);
    return IC_OK;
}

IC_RESULT FAR PASCAL IcPmEvent( unsigned    uType,
                                HANDLE      hSession,
                                GLOBALHANDLE hBuff,
                                unsigned    uSize)
```

```c
{
    /*
        Event types that your modifier doesn't handle
        MUST be passed on to the application.
    */

PSESSIONREC pSession;

pSession = GetSessionRec (hSession);
    if (pSession == NULL)
        return ReturnBadSessionError(hSession, BADSESSION_ERROR_6);
    switch (uType) {
    case IC_SESSIONESTABLISHED:
    case IC_XMTDONE:
    case IC_RCVDONE:
    case IC_XMTERROR:
    case IC_RCVERROR:
    case IC_STATUS:
    case IC_ERROR:
    default:
        return IcEvent( uType, hSession, hBuff, uSize );
        break;
    }
}

HANDLE FAR PASCAL IcPmIdentifySession( HANDLE hSession )
{
    return (HANDLE)NULL;
}

BOOL FAR PASCAL cbConfigDlg( HWND     hDlg,
                             unsigned message,
                             WORD     wParam,
                             LONG     lParam )
{
    IC_RESULT icerror;
    static LPCONFIG_RECORD lp_cr;

switch (message) {
        case WM_COMMAND: {
            switch (wParam) {
                case IDOK:
                    EndDialog( hDlg, TRUE );
                    break;
                case IDCANCEL:
                    EndDialog( hDlg, FALSE );
                    break;
                case ID_HELP:
                    icerror = IcRunHelp(HelpFile,
                                (DWORD)proc_config_modifier);
                    if (icerror != IC_OK)
                        ;
                    break;
                default:
                    return FALSE;
```

```
                break;
            }
            return TRUE;
        }
        break;
        case WM_INITDIALOG:
            lp_cr = (LPCONFIG_RECORD)lParam;
            return TRUE;
            break;
        default:
            return FALSE;
    }
    return FALSE;
}

HANDLE FAR PASCAL IcPmConfigPath( HWND    hWnd ,
                                  HANDLE hBuff )
{
    /*
        Configure the path passed from INFOConnect.
        Normally, this results in displaying a dialog
        box to the user.
    */

HANDLE hCr;
    LPCONFIG_RECORD lpBuff, lp_cr;
    int Success;

hCr = IcAllocBuffer(sizeof(config_record));
    if (hCr) {
        lp_cr = (LPCONFIG_RECORD) IcLockBuffer(hCr);
        lp_cr->hdr.RecordSize  = sizeof(config_record);
        if (hBuff == (HANDLE)NULL) { /* new configuration */
            lp_cr->hdr.ConfigFlags = IC_NOCONFIGFLAGS;
            /* Set modifier specific defaults here */
        } else { /* old configuration */
            lpBuff = (LPCONFIG_RECORD) IcLockBuffer(hBuff);
            lp_cr->hdr.ConfigFlags = lpBuff->hdr.ConfigFlags;
            /* Pick up modifier specifics here */
            IcUnlockBuffer(hBuff);
        }
        Success = DialogBoxParam( hMyInstance,
                                  IDD_CONFIG,
                                  hWnd,
                                  (FARPROC)cbConfigDlg,
                                  (DWORD)lp_cr );
        IcUnlockBuffer(hCr);
        if (Success < 1) {
            IcFreeBuffer(hCr);
            hCr = NULL;
        }
    }
    return (hCr);
}
```

```
/* ************************************************************ */
/* Windows DLL functions                                        */
/* ************************************************************ */

BOOL FAR PASCAL LIBMAIN( HANDLE hInstance,
                         WORD   wDataSeg,
                         WORD   wHeapSize,
                         LPSTR  lpCmdLine)
{
    /*
        This is a Windows-specific function required for all
        DLL libraries. It is called by Windows when the
        library is initially loaded.
    */ hMyInstance = hInstance;
    return TRUE;
}

/* DLL Termination Routine */ int FAR PASCAL WEP (int nParameter)
{
    /*
        This is a Windows-specific function required for all
        DLL libraries. It is called by Windows when the
        library is being unloaded.
    */ if (nParameter == WEP_SYSTEM_EXIT) {
        return (1);
    }
    else if (nParameter == WEP_FREE_DLL) {
        return (1);
    }
    else {
        return (1);
    }
}

/* ************************************************************ */
/* Local functions                                              */
/* ************************************************************ */ static void * GetMem (unsigned len)
{
    HANDLE    hMemory;

return (void NEAR *)LocalAlloc (LPTR, len);
} static void  FreeMem (void NEAR *ptr)
{
    LocalFree ((LOCALHANDLE)ptr);
}
```

```c
IC_RESULT ReturnInternalError(HANDLE hSession, unsigned errnum)
{
    char ErrInsert1[IC_MAXERRORINSERT+1];

wsprintf(ErrInsert1,"%u",errnum);
    return IcSetSessionError(hSession,
                             MyContext,
                             IC_ERROR_INTERNAL,
                             ErrInsert1,NULL,NULL);
}

IC_RESULT ReturnBadSessionError(HANDLE hSession, unsigned errnum)
{
    char ErrInsert1[IC_MAXERRORINSERT+1];

wsprintf(ErrInsert1,"%u",errnum);
    return IcSetSessionError(hSession,
                             MyContext,
                             IC_ERROR_BADSESSION,
                             ErrInsert1,NULL,NULL);
} static IC_RESULT   AddSessionRec    ( HANDLE  hSession,
                                      int     nChannel,
                                      HANDLE  hConfigBuf )
{
    /*
       The 'hSession' parameter is the INFOConnect session handle.
       New entries are added to the front of the list.
    */

PSESSIONREC p;
    LPCONFIG_RECORD lp_cr;
    IC_RESULT icerror;

p = (PSESSIONREC)GetMem(sizeof(SESSIONREC));
    if (p == NULL)
        return IcSetSessionError(hSession,
                                 MyContext,
                                 IC_ERROR_NOMEMORY,
                                 NULL,NULL,NULL);
    p->hSession = hSession;
    lp_cr = (LPCONFIG_RECORD) IcLockBuffer(hConfigBuf);
    if (lp_cr == NULL) {
        FreeMem(p);
        return IcSetSessionError(hSession,
                                 MyContext,
                                 IC_ERROR_NOMEMORY,
                                 NULL,NULL,NULL);
    }
    p->cr = *lp_cr;
    IcUnlockBuffer(hConfigBuf);

p->pNextSessionRec = pSessionNode;
```

```
      pSessionNode = p;
      return IC_OK;
} static IC_RESULT    DeleteSessionRec( HANDLE hSession )
{
    /*
       The 'hSession' parameter is the INFOConnect session handle.
       Find the matching session record and remove it from the list.
       Free any buffers still attached to the session.
    */

PSESSIONREC p, pPrev;

p = pSessionNode;
    while ((p != NULL) && (p->hSession != hSession)) {
       pPrev = p;
       p = p->pNextSessionRec;
    }
    if ((p == NULL) || (p->hSession != hSession))
       return IC_OK; /* session is already gone, don't complain */

/* Update links to skip the deleted record */
    if (p == pSessionNode)
       pSessionNode = p->pNextSessionRec;
    else
       pPrev->pNextSessionRec = p->pNextSessionRec;

/* Now free the session record itself */
    FreeMem (p);
    return IC_OK;
}

PSESSIONREC GetSessionRec    ( HANDLE hSession)
{
    /*
       Find a session record.
    */

PSESSIONREC p;

p = pSessionNode;

while ((p != NULL) && (p->hSession != hSession))
       p = p->pNextSessionRec;
    if ((p == NULL) || (p->hSession != hSession))
       return NULL;
    else
       return p;
}
```

APPENDIX III

Module definition (DEF) files for Protocol-Interfaces

A typical DEF file (eg. intrface.def) is shown below. The EXPORTS section must include the IcPi... entries as shown. The order is important. Any functions that are called by Windows (ie. dialog box callback functions) must be listed after the IcPi... entries.

```
;****************************************************/
;*  INTRFACE.DEF                                    */
;*                                                  */
;*      Sample INFOConnect Protocol-Interface       */
;*                                                  */
;****************************************************/

LIBRARY intrface
DESCRIPTION 'Sample INFOConnect Protocol-Interface'
EXETYPE WINDOWS
STUB 'WINSTUB.EXE'
CODE SHARED MOVEABLE DISCARDABLE PRELOAD ;DLLs require DATA SINGLE because there is only one instance
DATA SINGLE PRELOAD MOVEABLE
HEAPSIZE 4096
EXPORTS
        IcPiConfigPath      @1
        IcPiDeselectChannel @2
        IcPiEvent           @3
        IcPiGetString       @4
        IcPiIdentifySession @5
        IcPiInstall         @6
        IcPiLcl             @7
        IcPiRcv             @8
        IcPiSelectChannel   @9
        IcPiSetInfo         @10
        IcPiSetResult       @11
        IcPiTerminate       @12
        IcPiXmt             @13

;       Don't forget to include callback functions in this list cbConfigProc        @14
        TimerRoutine        @15

;       WEP is required for all Windows DLLs

WEP                 @16 RESIDENTNAME
```

```
DATA SINGLE PRELOAD MOVEABLE
HEAPSIZE 4096
EXPORTS
    IcPmConfigPath        @1
    IcPmDeselectChannel   @2
    IcPmEvent             @3
    IcPmGetString         @4
    IcPmIdentifySession   @5
    IcPmInstall           @6
    IcPmLcl               @7
    IcPmRcv               @8
    IcPmSelectChannel     @9
    IcPmSetInfo           @10
    IcPmSetResult         @11
    IcPmTerminate         @12
    IcPmXmt               @13

;   Don't forget to include callback functions in this list cbConfigDlg           @14

;   WEP is required for all Windows DLLs

WEP                   @15 RESIDENTNAME
```

The IMPLIB utility

You do NOT have to run the IMPLIB utility and create an import library for your DLL. INFOConnect applications are not linked directly with your DLL; they are linked with COMMMGR.LIB, an import library provided with the IDK.

REFLECT - A sample protocol-interface

```
/*****************************************************************/
/* REFLECT.C                                                     */
/*                                                               */
/*      Sample INFOConnect Protocol-Interface                    */
/*                                                               */
/*****************************************************************/

/*
    This protocol-interface simply stores any tranmitted
    messages from the application and returns them to the
    application when a receive is issued.
```

Receive requests are queued if there is no stored
message to return. As soon as a transmit is processed,
pending receives can be processed and passed to the
application.

This sample can be built and executed
without requiring an actual datacomm cable or specific
data communications environment.

*/

```c
#include         <windows.h>
#include         <icwin.h>
#include         <icproto.h>
#include         "reflect.h"
#include         "reflect.hh" /* online help header file */

/* ************************************************************ */
/* Global data and type declarations                             */
/* ************************************************************ */ char HelpFile[] = "reflect.hlp"; /* online help file */ define MAXRECORDSIZE 4096
define MAXCHANNEL 8
#define DEFAULTERRORFACTOR 1

HANDLE hMyInstance;
HWND hMyParent;
IC_RESULT_CONTEXT MyContext;

/* Timer */
#define TIMERRESOLUTION 2000
int nTimerID=0;

typedef struct {
   /* required by INFOConnect */
      IC_CONFIGHEADER hdr;

/* REFLECT-specific information */
      char sPrefix[40];
         /* String to be prefixed to each Rcv msg */
      int  nSimulatedErrorFactor;
         /*
            Can force Xmt/Rcv errors.
               =1 all Xmt/Rcvs are successful
               =2 every other Xmt/Rcv is successful
               =3 every third Xmt/Rcv is successful
                . etc
         */
} config_record;
```

```c
typedef config_record FAR *LPCONFIG_RECORD;

struct chaninfo {
    HANDLE   hSession;
    HANDLE   hTank;
    unsigned uTankSize;
    HANDLE   hRcvBuff;      /* queued request */
    unsigned uRcvBuffLen;   /* queued request */
    int      nXmtCount;     /* used in error simultation */
    int      nRcvCount;     /* used in error simultation */
    config_record cr;
} channel[MAXCHANNEL];

/* ************************************************************ */
/* Local support routines                                       */
/* ************************************************************ */

HANDLE    FAR PASCAL IcAllocBuffer(unsigned);
LPSTR     FAR PASCAL IcLockBuffer(HANDLE);     /* new */
IC_RESULT FAR PASCAL IcUnlockBuffer(HANDLE);   /* new */
IC_RESULT FAR PASCAL IcFreeBuffer(HANDLE);

BOOL OpenChannel (HANDLE hSession,
                  HANDLE hConfigRecord);

BOOL CloseChannel(HANDLE hSession);

int WriteChannel (HANDLE   hSession,
                  HANDLE   hBuff,
                  unsigned uBuffLen);

int ReadChannel  (HANDLE   hSession,
                  HANDLE   hBuff,
                  unsigned uBuffLen);

BOOL QueueChannel(HANDLE   hSession,
                  HANDLE   hBuff,
                  unsigned uBuffLen);

void FlushChannel(HANDLE hSession, BOOL bRcv);

WORD FAR PASCAL TimerRoutine(HWND hWnd,
                             WORD wMsg,
                             int nIDEvent,
                             DWORD dwTime);

/* ************************************************************ */
/* Required INFOConnect functions                               */
/* ************************************************************ */

IC_RESULT FAR PASCAL IcPiInstall(IC_RESULT_CONTEXT context)
```

```
{
    /*
        This procedure is called once by INFOConnect
        when the library is loaded.

Return IC_OK if initialization is successful.

IcP-Install can only use standard errors to
        report problems.
    */ int i;

MyContext = context;
    hMyParent = IcGetMyParent();

nTimerID=SetTimer(NULL,0,TIMERRESOLUTION,(FARPROC)TimerRoutine);
        if (nTimerID == 0)
            return IC_ERROR_TIMERS;

for (i=0; i<MAXCHANNEL; i++) {
            channel[i].hSession = (HANDLE)NULL;
        }
        return IC_OK;
}

IC_RESULT FAR PASCAL IcPiTerminate(void)
{
    /*
        This procedure is called once by INFOConnect when the
        protocol-interface library is no longer needed.

Free any resources used by open channels.
    */ int i;

for (i=0; i<MAXCHANNEL; i++) {
        channel[i].hSession = (HANDLE)NULL;
        if (channel[i].hTank)
            IcFreeBuffer(channel[i].hTank);
            IcFreeBuffer(channel[i].hTank);
            channel[i].hTank = (HANDLE)NULL;
            channel[i].hTank = (HANDLE)NULL;
    }
    if (nTimerID)
        KillTimer(NULL,nTimerID);

return IC_OK;
}
```

```
IC_RESULT FAR PASCAL .IcPiSelectChannel(HANDLE   hSession,
                                       int      nChannel,
                                       HANDLE   hConfigBuf)
{
    /*
        Called to establish a new session.
        Determine if there are any available channels.
        Initialize the new channel and return IC_OK.
    */ if (!hConfigBuf)
        return(IcSetSessionError(hSession, MyContext,
                IC_ERROR_INTERNAL,
                "IcPiSelectChannel",
                NULL, NULL));

if (!OpenChannel(hSession, hConfigBuf))
        return(IcSetSessionError(hSession, MyContext,
                IC_ERROR_PICHANNELINUSE,
                NULL, NULL, NULL));
    return IC_OK;
}

IC_RESULT FAR PASCAL IcPiDeselectChannel(HANDLE   hSession,
                                         int     nChannel)
{
    /*
        INFOConnect is closing a session.
        Free the channel assigned to this session.
    */

CloseChannel(hSession);
    return IC_OK;
}

IC_RESULT FAR PASCAL IcPiLcl (HANDLE hSession, WORD type)
{
    switch (type) {
    case IC_LCL_RCV:
    case IC_LCL_XMT:
    case IC_LCL_RCVXMT:
        FlushChannel(hSession, FALSE);
        return IC_OK;
        break;
    default:
        return(IcSetSessionError(hSession, MyContext,
                        IC_ERROR_INTERNAL,
                        "IcPiLcl/Unknown Type",
                        NULL, NULL));
        break;
    }
}
```

```c
IC_RESULT FAR PASCAL IcPiRcv (HANDLE   hSession,
                              HANDLE   hBuff,
                              unsigned uBuffLen)
{
   /*
      Process a receive request.

This sample simply returns any data in the
      holding tank to the protocol-modifier.
   */
   int len;
   IC_RESULT rcverror;
   IC_RESULT icerror = IC_OK;

len = ReadChannel (hSession, hBuff, uBuffLen);
   if (len != 0) {
      if (len > 0)
         icerror=IcPmEvent(IC_RCVDONE,hSession,hBuff,len);
      else {
         rcverror=IC_MAKE_RESULT(MyContext,
                                 REFLECT_ERROR_SEVERE,
                                 REFLECT_ERROR_RCVERROR);
         icerror=IcPmEvent(IC_RCVERROR, hSession,
                           HIWORD(rcverror), LOWORD(rcverror));
      }
   }
   else { /* No message available. Queue the request. */
      if (!QueueChannel (hSession, hBuff, uBuffLen))
         icerror=IcPmEvent(IC_RCVERROR,hSession,hBuff,0);
   }
   return icerror;
}

IC_RESULT FAR PASCAL IcPiXmt (HANDLE   hSession,
                              HANDLE   hBuff,
                              unsigned uBuffLen)
{
   /*
      Process a transmit request.

This sample simply returns any data in the
      holding tank to the protocol-modifier.
   */
   int len;
   IC_RESULT xmterror;
   IC_RESULT icerror = IC_OK;

len = WriteChannel (hSession, hBuff, uBuffLen);
   if (len >= 0) {
      icerror=IcPmEvent(IC_XMTDONE, hSession, 0, 0);
   }
```

```
    else {
       xmterror=IC_MAKE_RESULT(MyContext,
                            REFLECT_ERROR_SEVERE,
                            REFLECT_ERROR_XMTERROR);
       icerror=IcPmEvent(IC_XMTERROR, hSession,
                       HIWORD(xmterror), LOWORD(xmterror));
    }
    return icerror;
}

IC_RESULT FAR PASCAL IcPiEvent( unsigned     uType,
                                HANDLE       hSession,
                                GLOBALHANDLE hBuff,
                                unsigned     uSize)
{
    /*
       Event types that your interface doesn't handle
       MUST be passed on to the modifier.
    */ switch (uType) {
    case IC_SESSIONESTABLISHED:

default:
       return IcPmEvent( uType, hSession, hBuff, uSize);
       break;
    }
}

IC_RESULT FAR PASCAL IcPiSetInfo(HANDLE     hSession,
                                 LPIC_SINFO sinfo)
{
    /*
       The protocol-interface must initialize all SINFO fields.

See the INFOConnect Reference Manual for descriptions
       of the different attributes.
    */ sinfo->max_size = MAXRECORDSIZE;
    sinfo->transparent = TRUE;
    sinfo->block_mode = TRUE;
    sinfo->reliable = FALSE;
    sinfo->focus_notify = FALSE;
    return IC_OK;
}

IC_RESULT FAR PASCAL IcPiGetString(HANDLE    hSession,
                                   IC_RESULT icresult,
                                   LPSTR     buffer,
                                   unsigned  length)
{
```

```c
/*
    Return text for library specific errors.
*/

IC_RESULT_CONTEXT iccontext;
    IC_RESULT_TYPE    ictype;
    IC_RESULT_VALUE   icvalue;

iccontext = IC_GET_RESULT_CONTEXT(icresult);
    ictype = IC_GET_RESULT_TYPE(icresult);
    icvalue = IC_GET_RESULT_VALUE(icresult);

switch (ictype) {
    case REFLECT_ERROR_SEVERE:
        switch (icvalue) {
        case REFLECT_ERROR_XMTERROR:
        case REFLECT_ERROR_RCVERROR:
            if (LoadString(hMyInstance,icvalue,buffer,length)!=0)
                return IC_OK;
            else
                return(IcSetSessionError(hSession, MyContext,
                        IC_ERROR_INTERNAL,
                        "GetString/LoadString",
                        NULL, NULL));
            break;
        default:
            break;
        }
        break;
    default:
        break;
    }
    return(IcSetSessionError(hSession, MyContext,
                    IC_ERROR_INTERNAL,
                    "GetString/Unknown TypeValue",
                    NULL, NULL));
}

IC_RESULT FAR PASCAL IcPiSetResult( HANDLE    hSession,
                                    unsigned  uType,
                                    IC_RESULT result)
{
    /*
        Return IC_OK to ignore a status message.
    */ return IC_OK;
}

HANDLE FAR PASCAL IcPiIdentifySession (HANDLE hSession)
{
    return (HANDLE)NULL;
```

```
}

/*
    LP_CR is used to communication between IcPiConfigPath
    and its dialog callback function, cbConfigProc
*/
LPCONFIG_RECORD lp_cr;

BOOL FAR PASCAL cbConfigProc( HWND     hDlg,
                              unsigned message,
                              WORD     wParam,
                              LONG     lParam )
{
    /*
        This is the dialog callback function used when the user
        is configuring a path with this protocol.
        This function must appear in the .DEF file.
    */

IC_RESULT icerror;
    int i;

switch (message) {
        case WM_COMMAND:
            switch (wParam) {
                case IDOK:
                    GetDlgItemText( hDlg,
                                    IDC_PREFIX,
                                    lp_cr->sPrefix,
                                    sizeof(lp_cr->sPrefix));
                    i = GetDlgItemInt ( hDlg, IDC_ERROR_FACTOR,
                                        NULL, FALSE);
                    if (i==0)
                        i=1;
                    lp_cr->nSimulatedErrorFactor = i;
                    EndDialog( hDlg, TRUE );
                    return TRUE;
                    break;
                case IDCANCEL:
                    EndDialog( hDlg, FALSE );
                    return TRUE;
                    break;
                case ID_HELP:
                    icerror = IcRunHelp(HelpFile,
                                        (DWORD)proc_config_reflect);
                    /* if (icerror != IC_OK); */
                    break;
                default:
                    return FALSE;
                    break;
            }
            break;
```

```
        case WM_INITDIALOG:
            SetDlgItemText( hDlg,
                            IDC_PREFIX,
                            (LPSTR)lp_cr->sPrefix);
            SetDlgItemInt( hDlg,
                            IDC_ERROR_FACTOR,
                            lp_cr->nSimulatedErrorFactor,
                            FALSE);
            return TRUE;
            break;
        default:
            return FALSE;
    }
    return FALSE;
}

HANDLE FAR PASCAL IcPiConfigPath( HWND    hWnd,
                                    HANDLE hBuff )
{
    /*
        Initialize a global configuration buffer.
        Run a configuration dialog, if necessary.
    */

HANDLE  hCr;
    LPCONFIG_RECORD lpBuff;
    BOOL Success;

hCr = IcAllocBuffer(sizeof(config_record));
    if (hCr) {
        lp_cr = (LPCONFIG_RECORD) IcLockBuffer(hCr);
        lp_cr->hdr.RecordSize = (WORD)sizeof(config_record);
        if (hBuff == (HANDLE)NULL) {
            lp_cr->hdr.ConfigFlags = IC_NOCONFIGFLAGS;
            lp_cr->hdr.ChannelIndex = -1; /* disable */
            lstrcpy( lp_cr->sPrefix, (LPSTR)"Boing!" );
            lp_cr->nSimulatedErrorFactor = DEFAULTERRORFACTOR;
        } else { /* pick up existing configuration */
            lpBuff = (LPCONFIG_RECORD) IcLockBuffer(hBuff);
            lp_cr->hdr.ConfigFlags = lpBuff->hdr.ConfigFlags;
            lp_cr->hdr.ChannelIndex = lpBuff->hdr.ChannelIndex;
            lstrcpy( lp_cr->sPrefix, lpBuff->sPrefix );
            lp_cr->nSimulatedErrorFactor =
                            lpBuff->nSimulatedErrorFactor;
            IcUnlockBuffer(hBuff);
        }
        Success = DialogBox(hMyInstance,
                            "CONFIG",
                            hWnd,
                            (FARPROC)cbConfigProc);
        IcUnlockBuffer(hCr);
        if (!Success) {
```

```
            IcFreeBuffer(hCr);
            hCr = (HANDLE)NULL;
        }
    }
    return hCr;
}

/* ************************************************************ */
/* Windows DLL functions                                        */
/* ************************************************************ */

BOOL FAR PASCAL LIBMAIN( HANDLE hInstance,
                         WORD   wDataSeg,
                         WORD   wHeapSize,
                         LPSTR  lpCmdLine)
{
    /*
        This is a Windows-specific function required for all
        DLL libraries. It is called by Windows when the
        library is initially loaded.
    */ hMyInstance = hInstance;
    return TRUE;
}

/* DLL Termination Routine */ int FAR PASCAL WEP (int nParameter)
{
    /*
        This is a Windows-specific function required for all
        DLL libraries. It is called by Windows when the
        library is being unloaded.
    */ if (nParameter == WEP_SYSTEM_EXIT) {
        return (1);
    }
    else if (nParameter == WEP_FREE_DLL) {
        return (1);
    }
    else {
        return (1);
    }
}

/* ************************************************************ */
/* Local functions                                              */
/* ************************************************************ */

LPSTR    FAR PASCAL IcLockBuffer(HANDLE h)        /* new */
```

```c
{
    return((LPSTR)GlobalLock(h));
}

IC_RESULT FAR PASCAL IcUnlockBuffer(HANDLE h)   /* new */
{
    GlobalUnlock(h);
    return IC_OK;
} static BOOL OpenChannel(HANDLE hSession,
                        HANDLE hConfigRecord)
{
    /*
        Locate available channel in CHANNEL array.
        Save configuration information in CHANNEL array.
        Return FALSE if unable to find available channel.
    */

LPCONFIG_RECORD lp_cr;
    int i;

for (i=0; i < MAXCHANNEL; i++) {
        if (!channel[i].hSession) {
            channel[i].hSession = hSession;
            channel[i].hTank = (HANDLE)NULL;
            channel[i].uTankSize = 0;
            channel[i].hRcvBuff = (HANDLE)NULL;
            channel[i].uRcvBuffLen = 0;
            channel[i].nXmtCount = 0;
            channel[i].nRcvCount = 0;
            lp_cr = (LPCONFIG_RECORD) IcLockBuffer(hConfigRecord);
            if (lp_cr == NULL)
               return FALSE;
            channel[i].cr = *lp_cr;
            IcUnlockBuffer(hConfigRecord);
            return TRUE;
        }
    }
    return FALSE;
} static BOOL CloseChannel(HANDLE hSession)
{
    /*
        Locate the channel associated with this session in the
        CHANNEL array and free it up.
    */ int i;

for (i=0; i < MAXCHANNEL; i++) {
```

```
            if (channel[i].hSession == hSession) {
                channel[i].hSession = (HANDLE)NULL;
                if (channel[i].hTank) {
                    IcFreeBuffer(channel[i].hTank);
                    channel[i].hTank = (HANDLE)NULL;
                }
                channel[i].uTankSize = 0;
                channel[i].hRcvBuff = (HANDLE)NULL;
                channel[i].uRcvBuffLen = 0;
                return TRUE;
            }
        }
        return FALSE;
    } static int WriteChannel(HANDLE   hSession,
                            HANDLE   hBuff,
                            unsigned uBuffLen)
    {
        /*
            Find the channel for this session in the CHANNEL array.
            Allocate a holding tank to save the message.
            Retrieve the 'sPrefix' string from the configuration and
            stick it on the front of the message in the holding
            tank.

Return value
                >= 0    successful. number of characters written
                < 0     error

*/ int i, s, d;
        LPSTR lpSrc, lpDst;

for (i=0; i < MAXCHANNEL; i++) {
            if (channel[i].hSession == hSession) {
                if (++(channel[i].nXmtCount) %
                        channel[i].cr.nSimulatedErrorFactor)
                    return (-1);
                if (!channel[i].hTank) { /* discard old tank */
                    IcFreeBuffer(channel[i].hTank);
                    channel[i].hTank = (HANDLE)NULL;
                }
                channel[i].uTankSize = uBuffLen +
                                    strlen(channel[i].cr.sPrefix);
                channel[i].hTank =
                    IcAllocBuffer((LONG)channel[i].uTankSize);

lpSrc = IcLockBuffer(hBuff);
                lpDst = IcLockBuffer(channel[i].hTank);
                if (!lpSrc || !lpDst)
```

```
               return (-1);
            for (d=0; lpDst[d]=channel[i].cr.sPrefix[d]; d++);
            for (s=0; s<uBuffLen; d++,s++)
               lpDst[d] = lpSrc[s];
            IcUnlockBuffer(hBuff);
            IcUnlockBuffer(channel[i].hTank);
            return (channel[i].uTankSize);
         }
      }
      return (-1);
} static int ReadChannel(HANDLE   hSession,
                       HANDLE   hBuff,
                       unsigned uBuffLen)

{
   /*
      Find the channel for this session in the CHANNEL array.
      If there is no message in the holding tank, return
      FALSE.
      Otherwise, copy the saved message from the holding
      tank to the caller's buffer.

Return value
         > 0    number of characters in message
         = 0    no msg available
         < 0    error

*/ int i, j;
   LPSTR lpSrc, lpDst;

for (i=0; i < MAXCHANNEL; i++) {
      if (channel[i].hSession == hSession) {
         if (++(channel[i].nRcvCount) %
               channel[i].cr.nSimulatedErrorFactor)
            return (-1);
         if (!channel[i].hTank) /* No message */
            return 0;
         lpSrc = IcLockBuffer(channel[i].hTank);
         lpDst = IcLockBuffer(hBuff);
         for (j=0; j<min(uBuffLen,channel[i].uTankSize); j++)
            lpDst[j] = lpSrc[j];
         IcUnlockBuffer(hBuff);
         IcUnlockBuffer(channel[i].hTank);
         IcFreeBuffer(channel[i].hTank);
         channel[i].hTank = (HANDLE)NULL;
         return (j);
         /* return (channel[i].uTankSize); */
      }
```

```
            return (-1);
        for (d=0; lpDst[d]=channel[i].cr.sPrefix[d]; d++);
        for (s=0; s<uBuffLen; d++,s++)
            lpDst[d] = lpSrc[s];
        IcUnlockBuffer(hBuff);
        IcUnlockBuffer(channel[i].hTank);
        return (channel[i].uTankSize);
        }
    }
    return (-1);
} static int ReadChannel(HANDLE   hSession,
                       HANDLE   hBuff,
                       unsigned uBuffLen)

{
    /*
        Find the channel for this session in the CHANNEL array.
        If there is no message in the holding tank, return
        FALSE.
        Otherwise, copy the saved message from the holding
        tank to the caller's buffer.

Return value
            > 0     number of characters in message
            = 0     no msg available
            < 0     error

*/ int i, j;
    LPSTR lpSrc, lpDst;

for (i=0; i < MAXCHANNEL; i++) {
        if (channel[i].hSession == hSession) {
            if (++(channel[i].nRcvCount) %
                    channel[i].cr.nSimulatedErrorFactor)
                return (-1);
            if (!channel[i].hTank) /* No message */
                return 0;
            lpSrc = IcLockBuffer(channel[i].hTank);
            lpDst = IcLockBuffer(hBuff);
            for (j=0; j<min(uBuffLen,channel[i].uTankSize); j++)
                lpDst[j] = lpSrc[j];
            IcUnlockBuffer(hBuff);
            IcUnlockBuffer(channel[i].hTank);
            IcFreeBuffer(channel[i].hTank);
            channel[i].hTank = (HANDLE)NULL;
            return (j);
            /* return (channel[i].uTankSize); */
        }
```

```
        }
        return (-1);
} static BOOL QueueChannel(HANDLE    hSession,
                         HANDLE    hBuff,
                         unsigned  uBuffLen)

{
   /*
      A Rcv request for this channel must remain pending.
      Find the channel for this session in the CHANNEL array
      and save the Rcv buffer's handle and length.

Return FALSE if unable to queue the request.
   */ int i;

for (i=0; i < MAXCHANNEL; i++) {
      if (channel[i].hSession == hSession) {
         if (channel[i].hRcvBuff == (HANDLE)NULL) {
            channel[i].hRcvBuff = hBuff;
            channel[i].uRcvBuffLen = uBuffLen;
            return TRUE;
         }
         else /* request already queued up */
            break;
      }
   }
   return (FALSE);
} static void FlushChannel(HANDLE hSession, BOOL bRcv)

{
   /*
      Check if any receive requests are queued.
      If so, either discard them or issue Rcv
      based on 'bRcv' flag.
   */ int i;
   HANDLE hBuff;
   unsigned uBuffLen;

for (i=0; i < MAXCHANNEL; i++) {
      if (channel[i].hSession == hSession) {
         if (channel[i].hRcvBuff != (HANDLE)NULL) {
            hBuff = channel[i].hRcvBuff;
            uBuffLen = channel[i].uRcvBuffLen;
            channel[i].hRcvBuff = (HANDLE)NULL;
```

```
                channel[i].uRcvBuffLen = 0;
                if (bRcv)
                    IcPiRcv (hSession, hBuff, uBuffLen);
            }
            break;
        }
    }
}

WORD FAR PASCAL TimerRoutine(HWND hWnd,
                             WORD wMsg,
                             int nIDEvent,
                             DWORD dwTime)
{
    /*
        This timer routine periodically tries to flush
        any queued receive buffers.

This function must appear in the .DEF file.
    */ int i;

for (i=0; i < MAXCHANNEL; i++) {
        if (channel[i].hSession != NULL) {
            FlushChannel(channel[i].hSession, TRUE);
        }
    }
    return (0);
}
```

What is claimed is:

1. In a method of accomplishing data communications in a system which is portable to a plurality of computer operating environments, said system including a manager for controlling the passage of a datacomm message within said system and a plurality of communication paths, a method of dynamically configuring a communication path by a user, said method comprising the steps of:

a) requesting said manager to configure said communication path by a user;

b) said manager acquiring a list of protocol modifier programs and protocol interface programs that comprise said communication path;

c) said manager storing said list of protocol modifier programs and protocol interface programs as part of the path configuration;

d) said manager calling a next program configured in said list of protocol modifier programs and protocol interface programs with a configuration request;

e) said next program executing a sequence of configuration steps;

f) said next program notifying said manager when said configuration steps are complete;

g) repeating said steps c, d, and e until all programs configured in said communication path have been called whereby a configured communication path is provided for inter-process communication between a plurality of application programs; and h) generating a key to identify said configured communication path.

2. The method in step e in claim 1 wherein said configuration steps comprise:

said manager acquiring additional communication path information from said user interactively.

* * * * *